United States Patent
Yamanaka et al.

(10) Patent No.: US 8,915,784 B2
(45) Date of Patent: Dec. 23, 2014

(54) PROGRAM, INFORMATION STORAGE MEDIUM, AND IMAGE GENERATION SYSTEM

(75) Inventors: Aisaku Yamanaka, Kawaguchi (JP); Tatsuro Okamoto, Isehara (JP)

(73) Assignees: Bandai Namco Games Inc., Tokyo (JP); Nintendo Co., Ltd., Kyoto (JP)

( * ) Notice: Subject to any disclaimer, the term of this patent is extended or adjusted under 35 U.S.C. 154(b) by 1424 days.

(21) Appl. No.: 11/797,335

(22) Filed: May 2, 2007

(65) Prior Publication Data

US 2007/0270222 A1    Nov. 22, 2007

(30) Foreign Application Priority Data

May 8, 2006    (JP) ................. 2006-129692

(51) Int. Cl.
*A63F 13/00*    (2014.01)

(52) U.S. Cl.
CPC ......... *A63F 13/00* (2013.01); *A63F 2300/1006* (2013.01); *A63F 2300/1018* (2013.01); *A63F 2300/105* (2013.01); *A63F 2300/303* (2013.01); *A63F 2300/6045* (2013.01); *A63F 2300/8017* (2013.01)
USPC ..................... 463/37; 463/30; 463/31; 463/36

(58) Field of Classification Search
CPC ... A63F 13/06; A63F 13/10; A63F 2300/105; A63F 2300/1043; A63F 2300/1006; A63F 2300/1018; A63F 2300/8017; A63F 2300/303
USPC .......................................... 463/36–37, 30, 31
See application file for complete search history.

(56) References Cited

U.S. PATENT DOCUMENTS

| | | | |
|---|---|---|---|
| 5,649,861 A | | 7/1997 | Okano et al. |
| 5,913,727 A | * | 6/1999 | Ahdoot ........................ 463/39 |
| 6,001,017 A | | 12/1999 | Okano et al. |
| 6,375,572 B1 | * | 4/2002 | Masuyama et al. ............ 463/43 |
| 6,585,593 B1 | | 7/2003 | Okano et al. |
| 6,592,455 B1 | | 7/2003 | Okano et al. |
| 6,645,067 B1 | * | 11/2003 | Okita et al. ...................... 463/7 |
| 6,685,480 B2 | * | 2/2004 | Nishimoto et al. .......... 434/247 |
| 6,702,677 B1 | * | 3/2004 | Fujisawa et al. .............. 463/43 |
| 6,921,332 B2 | | 7/2005 | Fukunaga et al. |
| 6,932,706 B1 | * | 8/2005 | Kaminkow .................... 463/36 |
| 7,223,173 B2 | * | 5/2007 | Masuyama et al. ............ 463/36 |
| 7,331,856 B1 | * | 2/2008 | Nakamura et al. ............... 463/7 |

(Continued)

FOREIGN PATENT DOCUMENTS

| | | |
|---|---|---|
| JP | A-2000-070553 | 3/2000 |
| JP | A-2002-153673 | 5/2002 |
| JP | A 2003-225467 | 8/2003 |

*Primary Examiner* — William H McCulloch, Jr.
(74) *Attorney, Agent, or Firm* — Oliff PLC

(57) ABSTRACT

A program for playing a game based on an input from an operation section including a first controller and a second controller, the program causing a computer to function as: a movement operation input detection section which determines whether or not an output value from a movement sensor provided in at least one of the first controller and the second controller satisfies a detection condition for a movement operation input; a game calculation section which performs a game calculation process based on the movement operation input; an operation input display control section which performs a display control process of a movement operation input display object for displaying a detection result of the movement operation input; and an image generation section which generates a game image including the movement operation input display object.

20 Claims, 21 Drawing Sheets

(56) References Cited

U.S. PATENT DOCUMENTS

| | | | | |
|---|---|---|---|---|
| 7,401,783 B2* | 7/2008 | Pryor | | 273/237 |
| 7,412,348 B2* | 8/2008 | Okamura | | 702/152 |
| 7,424,388 B2* | 9/2008 | Sato | | 702/152 |
| 7,479,064 B2* | 1/2009 | Wakitani et al. | | 463/36 |
| 7,582,015 B2* | 9/2009 | Onoda et al. | | 463/30 |
| 7,618,322 B2* | 11/2009 | Shimizu et al. | | 463/36 |
| 7,618,323 B2* | 11/2009 | Rothschild et al. | | 463/37 |
| 7,628,699 B2* | 12/2009 | Onoda et al. | | 463/36 |
| 7,722,450 B2* | 5/2010 | Onoda et al. | | 463/7 |
| 7,744,466 B2* | 6/2010 | Yoshinobu et al. | | 463/35 |
| 7,815,508 B2* | 10/2010 | Dohta | | 463/37 |
| 7,833,099 B2* | 11/2010 | Sato et al. | | 463/37 |
| 7,833,100 B2* | 11/2010 | Dohta | | 463/36 |
| 7,834,848 B2* | 11/2010 | Ohta | | 345/157 |
| 7,850,527 B2* | 12/2010 | Barney et al. | | 463/37 |
| 7,854,656 B2* | 12/2010 | Sato et al. | | 463/36 |
| 7,872,638 B2* | 1/2011 | Sato | | 345/164 |
| 7,890,199 B2* | 2/2011 | Inagaki | | 700/94 |
| 7,927,216 B2* | 4/2011 | Ikeda et al. | | 463/38 |
| 7,931,535 B2* | 4/2011 | Ikeda et al. | | 463/38 |
| 7,938,725 B2* | 5/2011 | Okamura | | 463/37 |
| 7,942,745 B2* | 5/2011 | Ikeda et al. | | 463/38 |
| 7,980,951 B2* | 7/2011 | Yoshida | | 463/36 |
| 7,980,952 B2* | 7/2011 | Ohta | | 463/36 |
| 7,988,558 B2* | 8/2011 | Sato | | 463/37 |
| 8,012,004 B2* | 9/2011 | Yamashita | | 463/4 |
| 8,303,412 B2* | 11/2012 | Okamura | | 463/37 |
| 8,308,563 B2* | 11/2012 | Ikeda et al. | | 463/37 |
| 8,308,565 B2* | 11/2012 | Nakanishi et al. | | 463/37 |
| 2001/0008849 A1* | 7/2001 | Komata | | 463/37 |
| 2002/0065121 A1* | 5/2002 | Fukunaga et al. | | 463/8 |
| 2002/0151337 A1* | 10/2002 | Yamashita et al. | | 463/8 |
| 2005/0014542 A1* | 1/2005 | Ueshima | | 463/8 |
| 2005/0085284 A1* | 4/2005 | Onoda et al. | | 463/7 |
| 2005/0085297 A1* | 4/2005 | Onoda et al. | | 463/37 |
| 2005/0096132 A1* | 5/2005 | Ueshima et al. | | 463/37 |
| 2005/0233808 A1* | 10/2005 | Himoto et al. | | 463/37 |
| 2005/0245315 A1* | 11/2005 | Shimizu et al. | | 463/37 |
| 2005/0288099 A1* | 12/2005 | Shimizu et al. | | 463/37 |
| 2006/0223635 A1* | 10/2006 | Rosenberg | | 463/37 |
| 2006/0252539 A1* | 11/2006 | Zhang et al. | | 463/36 |
| 2006/0258454 A1* | 11/2006 | Brick | | 463/36 |
| 2006/0287087 A1* | 12/2006 | Zalewski et al. | | 463/37 |
| 2007/0049374 A1* | 3/2007 | Ikeda et al. | | 463/30 |
| 2007/0060228 A1* | 3/2007 | Akasaka et al. | | 463/1 |
| 2007/0060383 A1* | 3/2007 | Dohta | | 463/43 |
| 2007/0111779 A1* | 5/2007 | Osnato et al. | | 463/16 |
| 2007/0213109 A1* | 9/2007 | Sato et al. | | 463/3 |
| 2007/0213127 A1* | 9/2007 | Sato | | 463/36 |
| 2007/0270222 A1* | 11/2007 | Yamanaka et al. | | 463/37 |
| 2007/0270223 A1* | 11/2007 | Nonaka et al. | | 463/37 |
| 2012/0115595 A1* | 5/2012 | Ohta et al. | | 463/30 |
| 2014/0080109 A1* | 3/2014 | Haseltine et al. | | 434/308 |
| 2014/0155138 A1* | 6/2014 | Kim et al. | | 463/24 |
| 2014/0171203 A1* | 6/2014 | Sawano et al. | | 463/37 |

* cited by examiner

FIG.2A
FIG.2B
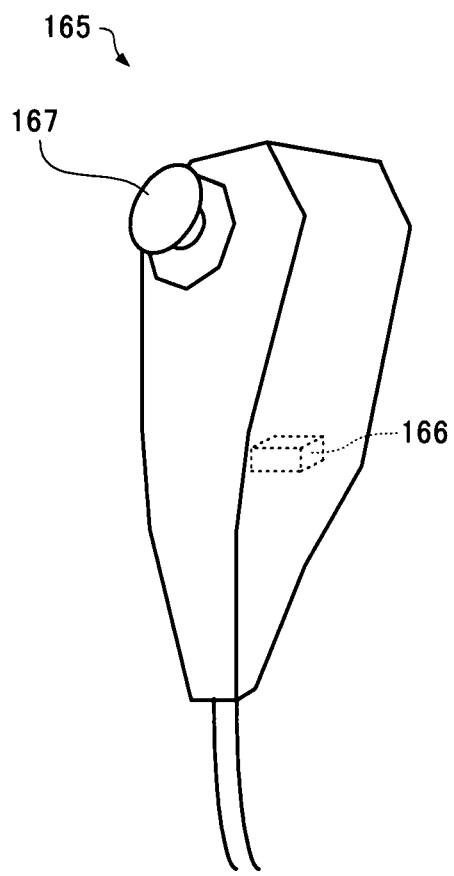
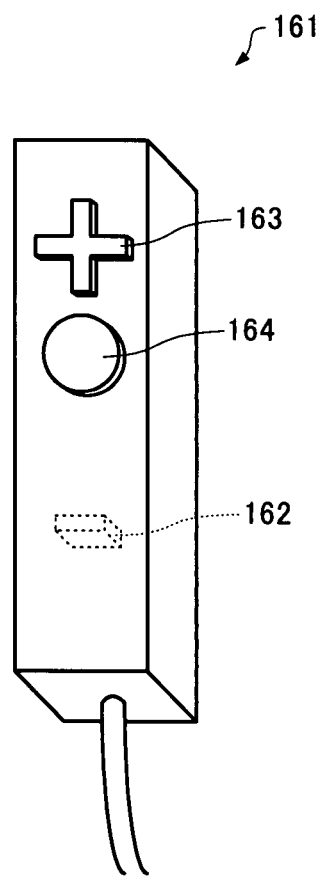

US 8,915,784 B2

PROGRAM, INFORMATION STORAGE MEDIUM, AND IMAGE GENERATION SYSTEM

Japanese Patent Application No. 2006-129692, filed on May 8, 2006, is hereby incorporated by reference in its entirety.

BACKGROUND OF THE INVENTION

The present invention relates to a program, an information storage medium, and an image generation system.

In recent years, a game device has been developed in which a sensor (e.g. acceleration sensor) capable of detecting movement is provided in a game controller, and the movement of the controller is detected and used as a game input.

In such a game device, the player can input a predetermined command by shaking the controller or making a predetermined movement. This makes it possible to provide an exciting game in which the player moves the controller by making a movement similar to the movement performed in the game. JP-A-2003-225467 discloses technology in this field, for example.

However, it is difficult for the player to determine whether or not the operation input performed by movement such as shaking the controller is actually accepted, differing from an input using a button or the like.

Moreover, the amplitude, cycle, and strength of the movement of shaking the controller differ depending on the player, for example. Therefore, when an inexperienced player inputs a command by shaking the controller, the command may not be accepted.

SUMMARY

According to a first aspect of the invention, there is provided a program for playing a game based on an input from an operation section including a first controller and a second controller, the program causing a computer to function as:

a movement operation input detection section which determines whether or not an output value from a movement sensor provided in at least one of the first controller and the second controller satisfies a detection condition for a movement operation input;

a game calculation section which performs a game calculation process based on the movement operation input;

an operation input display control section which performs a display control process of a movement operation input display object for displaying a detection result of the movement operation input; and an image generation section which generates a game image including the movement operation input display object.

According to a second aspect of the invention, there is provided a program for playing a game based on an input from an operation section including a first controller and a second controller, the program causing a computer to function as:

a movement operation input detection section which determines whether or not an output value from a movement sensor provided in at least one of the first controller and the second controller satisfies detection conditions for a movement operation input;

a game calculation section which performs a game calculation process based on the movement operation input;

a command notification sound output control section which performs an output control process of movement operation input notification sound for indicating a detection result of the movement operation input; and an image generation section which generates a game image.

According to a third aspect of the invention, there is provided a computer-readable information storage medium storing any one of the above-described programs.

According to a fourth aspect of the invention, there is provided an image generation system for playing a game based on an input from an operation section including a first controller and a second controller, the image generation system comprising:

a movement operation input detection section which determines whether or not an output value from a movement sensor provided in at least one of the first controller and the second controller satisfies a detection condition for a movement operation input;

a game calculation section which performs a game calculation process based on the movement operation input;

an operation input display control section which performs a display control process of a movement operation input display object for displaying a detection result of the movement operation input; and an image generation section which generates a game image including the movement operation input display object.

According to a fifth aspect of the invention, there is provided an image generation system for playing a game based on an input from an operation section including a first controller and a second controller, the image generation system comprising:

a movement operation input detection section which determines whether or not an output value from a movement sensor provided in at least one of the first controller and the second controller satisfies detection conditions for a movement operation input;

a game calculation section which performs a game calculation process based on the movement operation input;

a command notification sound output control section which performs an output control process of movement operation input notification sound for indicating a detection result of the movement operation input; and an image generation section which generates a game image.

BRIEF DESCRIPTION OF THE SEVERAL VIEWS OF THE DRAWING

FIGS. 2A and 2B are views showing an example of an operation section according to one embodiment of the invention.

DETAILED DESCRIPTION OF THE EMBODIMENT

Figure 1:
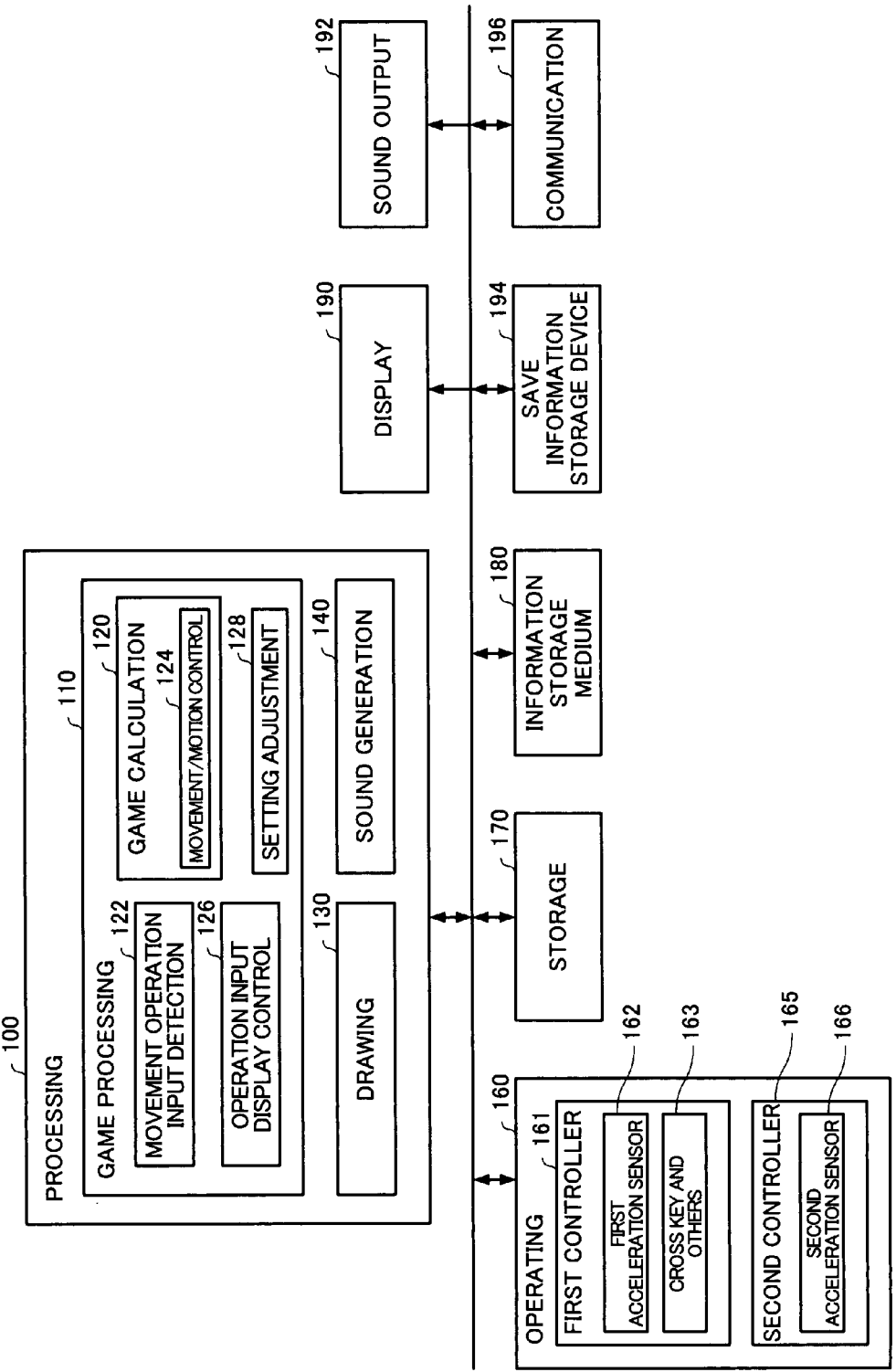
FIG. 1 is a functional block diagram of an image generation system according to one embodiment of the invention.

An object of the invention is to provide a program, an information storage medium, and an image generation system enabling a player to play a game while checking whether or not a movement operation input which is input by moving a controller is accepted.

(1) According to one embodiment of the invention, there is provided a program for playing a game based on an input from an operation section including a first controller and a second controller, the program causing a computer to function as:

a movement operation input detection section which determines whether or not an output value from a movement sensor provided in at least one of the first controller and the second controller satisfies a detection condition for a movement operation input;

a game calculation section which performs a game calculation process based on the movement operation input;

an operation input display control section which performs a display control process of a movement operation input display object for displaying a detection result of the movement operation input; and an image generation section which generates a game image including the movement operation input display object.

According to one embodiment of the invention, there is provided an image generation system comprising the above-described sections. According to one embodiment of the invention, there is provided a computer-readable information storage medium storing a program causing a computer to function as the above-described sections.

The movement sensor may be formed using an acceleration sensor, a velocity sensor, a sensor which measures displacement, or the like.

The player may operate the first controller and the second controller while holding the first controller with the right (left) hand and the second controller with the left (right) hand.

Each of the first controller and the second controller may include the movement sensor, or one of the first controller and the second controller may include the movement sensor.

The term "movement operation input" refers to an operation input which is input by causing the first controller and the second controller to make predetermined movements or holding the first controller and the second controller in predetermined postures. A configuration in which the movement operation input is input while combining an operation input from another operation section such as a button or a cross key (e.g. operation input performed by shaking the controller while pressing a button of the controller) also falls within the scope of the movement operation input according to this embodiment in addition to a configuration in which the movement operation input is input by causing the first controller and the second controller to make predetermined movements.

The given game calculation process performed based on the movement operation input may be a control calculation process of the movement, motion, and position of an object (game character, item, and other objects as the operation target of the player) in the game space, a hit check process, a calculation process of an associated game parameter, control of power and difficulty, or a determination process of a performance input in a music game, for example.

The movement operation input display object may be a three-dimensional object, a two-dimensional object, a character, or a mark.

The detection result of the movement operation input may be displayed by displaying the presence or absence of the movement operation input or displaying the amount of operation when the input value (amount of operation) of the movement operation input is also used as the control element, for example.

The display control of the movement operation input may be control of the presence or absence of display or control of the display state (including control of changing the color, shape, size, and the like of the movement operation input display object and control of changing the luminance of the movement operation input display object or causing the movement operation input display object to blink, for example).

According to this embodiment, since the detection result of the movement operation input is displayed as the movement operation input display target, the player can play the game while checking whether or not the operation input performed by moving the controller is detected as the movement operation input.

(2) In each of the image generation system, the program and the information storage medium, the game calculation section may include a movement/motion control section which controls movement or motion of an object based on a movement operation input.

In this embodiment, the object as the movement or motion target of the movement operation input may be an operation target object of the player, such as a player's character or an item object possessed by the player.

The term "movement or motion" includes a moving velocity, an acceleration, a moving direction, rotation, movement of a character, and the like.

(3) In each of the image generation system, the program and the information storage medium, the movement operation input detection section may determine a detection condition for a movement operation input based on an output value from the movement sensor provided in at least one of the first controller and the second controller and another operation input value.

According to this embodiment, the detection result of the movement operation input performed by combining an input performed by moving the controller and an input performed using another input means can also be displayed as the movement operation input display target.

The other input means may be a button, a cross key, and the like provided on the first controller and the second controller. This allows the player to input the movement operation input by moving the controller while pressing the button or the like provided on the controller.

(4) In each of the image generation system, the program and the information storage medium, the operation input display control section may control the movement operation input display object to be displayed or changed during a predetermined period of time at a predetermined timing.

For example, a configuration in which the movement operation input display object is displayed for only a predetermined period and is not displayed thereafter, or a configuration in which the movement operation input display object is changed for only a predetermined period and is not changed thereafter may be employed.

According to this configuration, when display or a change of the movement operation input display object has been completed, the player can be notified of information such as information prompting the player to again input the movement operation input or information indicating that the movement operation input can be input.

For example, when providing a predetermined acceptance prohibition period after accepting the movement operation input, the movement operation input display object may be displayed or changed during the acceptance prohibition period. This makes it easy for the player to become aware of the movement operation input acceptance prohibition period.

(5) In each of the image generation system, the program and the information storage medium, the operation input display control section may display the movement operation input display object for displaying a detection result of a movement operation input.

The presence or absence of the movement operation input display object display may be changed or the form (length or size of gauge, shape of mark, display state, color, and value indicated by numerals) of the movement operation input display object may be at least partially changed corresponding to the detection result.

(6) In each of the image generation system, the program and the information storage medium, when a movement operation input relates to orientation or rotation of an object, the game calculation section may calculate a game parameter for controlling orientation or rotation of an object based on the movement operation input; and when a movement operation input relates to orientation or rotation of an object, the operation input display control section may display a movement operation input display object for displaying orientation or rotational direction.

According to this embodiment, the player can become aware of detection of the movement operation input and the orientation (direction) or rotational direction indicated by the movement operation input.

(7) In each of the image generation system, the program and the information storage medium, the movement operation input detection section may detect an amount of operation associated with a movement operation input based on an output value from the movement sensor;

the game calculation section may calculate a game parameter associated with a movement operation input according to the amount of operation associated with a movement operation input; and the operation input display control section may display a movement operation input display object for displaying the amount of operation associated with a movement operation input.

The amount of operation associated with the movement operation input may be determined by the output value from the movement sensor. In this case, a sensor of which the output value has a size (sensor other than a sensor which detects only ON and OFF) may be used.

When using the amount of operation associated with the movement operation input, the type of instruction may be determined by the movement operation input, and the amount of change indicated by the instruction may be determined corresponding to the associated amount of operation. For example, when the movement operation input indicates acceleration, the degree of acceleration (e.g. acceleration value) may be controlled corresponding to the associated amount of operation.

(8) In each of the image generation system, the program and the information storage medium, the movement operation input detection section may determine whether or not a condition for a movement operation input is satisfied based on an output value from a first movement sensor provided in the first controller and an output value from a second movement sensor provided in the second controller; and the operation input display control section may perform the display control process for displaying detection of a movement operation input by using a first movement operation input display object associated with the first controller and a second movement operation input display object associated with the second controller.

For example, the first movement operation input display object may be changed when a movement operation input determined based on the movement of the first controller has been detected, the second movement operation input display object may be changed when a movement operation input determined based on the movement of the second controller has been detected, and the first movement operation input display object and the second movement operation input display object may be changed when a movement operation input determined based on the movements of the first controller and the second controller has been detected. This makes it easy for the player to determine the relationship between the detection state of the movement operation input and the movement states of the first and second controllers.

(9) In each of the image generation system, the program and the information storage medium, the movement operation input detection section may determine whether or not an output value from the movement sensor provided in at least one of the first controller and the second controller satisfies a given condition; and the operation input display control section may display a movement operation input display object indicating generation or type of a pattern corresponding to the given condition.

According to this embodiment, the player can become aware that a pattern corresponding to the given conditions has been generated by the movement of the controller or identify the type of the generated pattern.

For example, when the output value from the movement sensor satisfies given conditions in a performance game, the operation input display control section may display the movement operation input display object indicating generation or the type of a given performance pattern.

For example, when the output value from the movement sensor satisfies given conditions in a performance game, the operation input display control section may display the movement operation input display object indicating generation or the type of a given performance pattern.

For example, when the output value from the movement sensor satisfies given conditions in a fighting game, the operation input display control section may display the movement operation input display object indicating generation or the type of a given skill pattern.

(10) In each of the image generation system, the program and the information storage medium, the movement operation input detection section may include means for detecting movement performed in a given period based on an output value from the movement sensor provided in at least one of the first controller and the second controller; and the operation input display control section may display a movement operation input display object indicating the detected movement.

For example, the movement of the controller in a predetermined period may be reproduced as the movement operation input display object. This enables the player to view the player's movement performed in a predetermined period.

(11) In each of the image generation system, the program and the information storage medium, the movement operation input detection section may determine whether or not a detection condition for a movement operation input is satisfied based on a total value of an output value from a first movement sensor and an output value from a second movement sensor; and the operation input display control section may display a movement operation input display object indicating the total value of the output value from the first movement sensor and the output value from the second movement sensor.

(12) In each of the image generation system, the program and the information storage medium, the game calculation section may include means for calculating a game parameter of an object based on a command corresponding to an operation input from operation input means provided in the operation section other than the movement sensor, and the operation input display control section may perform display control of an operation input display object for displaying a detection result of an operation input corresponding to an operation input from operation input means provided in the operation section other than the movement sensor.

The operation input display object and the movement operation input display object may be configured as different objects.

According to this embodiment, the player can also become aware of the acceptance state of the operation input using the operation section such as a button, a lever, and a cross key.

(13) Each of the image generation system, the program and the information storage medium may cause the computer to function as:

a setting adjustment section which sets an initial setting operation period in which an initial setting operation input for a movement operation input is accepted, and adjusts a setting value of a condition for a movement operation input based on an output value from the movement sensor obtained by operation of the controller during the initial setting operation period.

(14) According to one embodiment of the invention, there is provided a program for playing a game based on an input from an operation section including a first controller and a second controller, the program causing a computer to function as:

a movement operation input detection section which determines whether or not an output value from a movement sensor provided in at least one of the first controller and the second controller satisfies detection conditions for a movement operation input;

a game calculation section which performs a game calculation process based on the movement operation input;

a command notification sound output control section which performs an output control process of movement operation input notification sound for indicating a detection result of the movement operation input; and an image generation section which generates a game image.

According to one embodiment of the invention, there is provided a game system comprising the above-described sections. According to one embodiment of the invention, there is provided a computer-readable information storage medium storing a program causing a computer to function as the above-described sections.

The embodiments of the invention will be described in detail below, with reference to the drawings. Note that the embodiments described below do not unduly limit the scope of the invention laid out in the claims herein. In addition, not all of the elements of the embodiments described below should be taken as essential requirements of the invention.

1. Configuration

An image generation system (game system) according to one embodiment of the invention is described below with reference to FIG. 1. FIG. 1 shows an example of a functional configuration of the image generation system according to this embodiment. Note that some of the elements (sections) may be omitted from the image generation system according to this embodiment.

An operating section 160 allows a player to input operation data. The function of the operating section 160 may be implemented by a lever, a button, a steering wheel, a microphone, or the like.

The operation section 160 is implemented by a first controller 161 and a second controller.

The first controller 161 includes a first acceleration sensor (example of movement sensor) 162 and an operation input means (e.g. button and cross key) for obtaining an operation input value other than the acceleration sensor.

The second controller 165 includes a second acceleration sensor (example of movement sensor) 166.

The first acceleration sensor 162 detects an acceleration vector which occurs due to the movement of the first controller 161.

The second acceleration sensor 166 detects an acceleration vector which occurs due to the movement of the second controller 165.

The first acceleration sensor 162 and the second acceleration sensor 166 detect the acceleration corresponding to the operation, and output the detected acceleration information (output value). The first acceleration sensor 162 and the second acceleration sensor 166 may be implemented by piezoelectric type, electrodynamic type, or strain gauge type hardware, for example.

In this embodiment, the output value from the acceleration sensor 3 is a value obtained by converting a "down" direction (negative Y axis direction) in a world coordinate system into a controller standard coordinate system.

A storage section 170 serves as a work area for a processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a hard disk, a memory card, a memory cassette, a magnetic disk, a memory (ROM), or the like. The processing section 100 performs various processes according to this embodiment based on a program (data) stored in the information storage medium 180. Specifically, a program for causing a computer to function as each section according to this embodiment (program for causing a computer to execute the process of each section) is stored in the information storage medium 180.

A display section 190 outputs an image generated according to this embodiment. The function of the display section 190 may be implemented by a CRT, a liquid crystal display (LCD), a touch panel display, a head mount display (HMD), or the like.

A sound output section 192 outputs sound generated according to this embodiment. The function of the sound output section 192 may be implemented by a speaker, a headphone, or the like.

A portable information storage device 194 stores player's personal data, game save data, and the like. As the portable information storage device 194, a memory card, a portable game device, and the like can be given. The communication section 196 performs various types of control for communicating with the outside (e.g. host device or another image generation system). The function of the communication section 196 may be implemented by hardware such as a processor or a communication ASIC, a program, or the like.

The program (data) for causing a computer to function as each section according to this embodiment may be distributed to the information storage medium 180 (storage section 170) from an information storage medium included in a host device (server) through a network and the communication section 196. Use of the information storage medium of the host device (server) is also included within the scope of this embodiment.

The processing section 100 (processor) performs various processes such as issuance of instructions to each functional block, a game process, an image generation process, and a sound generation process. The game process includes a process of starting a game when game start conditions have been satisfied, a process of proceeding with a game, a process of disposing an object such as a character or a map, a process of displaying an object, a process of calculating game results, a process of finishing a game when game end conditions have been satisfied, and the like.

The function of the processing section 100 may be implemented by hardware such as a processor (e.g. CPU or DSP) or ASIC (e.g. gate array) and a program. The processing section 100 performs various processes using the storage section 170 as a work area.

The processing section 100 includes a game processing section 110, a drawing section 130, and a sound generation section 140. Note that the game processing section 110 may have a configuration in which some of these sections are omitted.

The game processing section 110 includes a game calculation section 120, a movement operation input detection section 122, an operation input display control section 126, and a setting adjustment section 128.

The movement operation input detection section 122 determines whether or not the output value from the movement sensor provided in at least one of the first controller and the second controller satisfies movement operation input detection conditions.

The game calculation section 120 performs a given game calculation process based on a movement operation input.

The operation input display control section 126 performs a display control process of a movement operation input display object for displaying a movement operation input detection result.

The game calculation section 120 includes a movement/motion control section 124 which controls the movement or motion of an object based on the movement operation input.

The movement operation input detection section 122 may determine detection conditions for a given movement operation input based on the output value from the movement sensor provided in at least one of the first controller and the second controller and another operation input value.

The operation input display control section 126 may control the movement operation input display object to be displayed or changed during a predetermined period of time at a predetermined timing.

The operation input display control section 126 may display the movement operation input display object for displaying the movement operation input detection result.

When a given movement operation input is a movement operation input relating to the orientation or rotation of the object, the movement/motion control section 124 may calculate a game parameter for controlling the orientation or rotation of the object based on the movement operation input. When a given movement operation input is a movement operation input relating to the orientation or rotation of the object, the operation input display control section 126 may display the movement operation input display object for displaying the orientation or rotational direction.

The movement operation input detection section 122 may detect the amount of operation associated with the movement operation input based on the output value from the movement sensor, the movement/motion control section 124 may calculate the game parameter associated with the movement operation input according to the amount of operation associated with the movement operation input, and the operation input display control section 126 may display the movement operation input display object for displaying the amount of operation associated with the movement operation input.

The movement operation input detection section 122 may determine whether or not conditions for a given movement operation input are satisfied based on the output value from the movement sensor provided in the first controller and the output value from the movement sensor provided in the second controller, and the operation input display control section 126 may perform the display control process for displaying detection of the movement operation input using a first movement operation input display object associated with the first controller and a second movement operation input display object associated with the second controller.

The movement operation input detection section 122 may determine whether or not the output value from the movement sensor provided in at least one of the first controller and the second controller satisfies given conditions, and the operation input display control section 126 may display the movement operation input display object indicating generation or the type of a pattern corresponding to the given conditions.

The movement operation input detection section 122 may include means for detecting movement performed in a given period based on the output value from the movement sensor provided in at least one of the first controller and the second controller, and the operation input display control section 126 may display the movement operation input display object indicating the detected movement.

The movement/motion control section 124 may determine whether or not conditions for a given movement operation input are satisfied based on the total value of the output value from the first movement sensor and the output value from the second movement sensor, and the operation input display control section 126 may display the movement operation input display object indicating the total value of the output value from the first movement sensor and the output value from the second movement sensor.

The movement/motion control section 124 may include means for calculating the game parameter for controlling the movement or motion of the object based on a command corresponding to the operation input from the operation input means other than the movement sensor provided in the operation section, and the operation input display control section 126 may perform display control of a command display object for displaying detection or an execution result of the command corresponding to the operation input from the operation input means other than the movement sensor provided in the operation section.

The setting adjustment section 128 sets an initial setting operation period in which an initial setting operation input for the movement operation input is accepted, and adjusts the setting value of conditions for a given movement operation input based on the output value from the movement sensor obtained by the operation of the controller during the initial setting operation period.

The movement/motion control section 124 calculates the movement or motion (movement/motion simulation) of the object such as a moving object (e.g. character, car, or airplane). Specifically, the movement/motion processing section 124 causes the object (moving object) to move in an object space or to make a movement (motion or animation) based on operational data input by the player using the operation section 160, a program (movement/motion algorithm), various types of data (motion data), and the like.

In more detail, the movement/motion processing section 124 according to this embodiment performs a simulation process of sequentially calculating movement information (position, rotational angle, velocity, or acceleration) and motion information (position or rotational angle of each part object) of the object in frame (1/60 sec) units. The frame is a time unit for performing the object movement/motion process (simulation process) and the image generation process.

The movement/motion processing section 124 may control at least one of the rotation, the posture, the movement, and the moving direction of the operation target object in the object space based on a calculated orientation/rotation parameter.

The game processing section 110 may include an object space setting section (not shown). The object space setting section disposes in the object space various objects (objects formed by a primitive surface such as a polygon, a free-form surface, or a subdivision surface) representing display objects such as a character, a car, a tank, a building, a tree, a pillar, a wall, or a map (topography). Specifically, the object space setting section determines the position and the rotational angle (synonymous with orientation or direction) of an object (model object) in a world coordinate system, and disposes the object at the determined position (X, Y, Z) and the determined rotational angle (rotational angles around X, Y, and Z axes).

The game processing section 110 may include a virtual camera control section (not shown). The virtual camera control section controls the position, the rotation (orientation), and the like of a virtual camera based on the input from the player.

The drawing section 130 performs a drawing process based on results for various processes (game processes) performed by the game processing section 120 to generate an image, and outputs the image to the display section 190. When generating a three-dimensional game image, object data (model data) including vertex data (e.g. vertex position coordinates, texture coordinates, color data, normal vector, or alpha value) of each vertex of the object (model) is input, and the drawing section 130 performs a vertex process based on the vertex data included in the input object data.

When performing the vertex process, the drawing section 130 may perform a vertex generation process (tessellation, curved surface division, or polygon division) for subdividing the polygon, if necessary.

In the vertex process, the drawing section 130 performs a vertex movement process and a geometric process such as coordinate transformation (world coordinate transformation or camera coordinate transformation), clipping, perspective transformation, or light source process, and changes (updates or adjusts) vertex data of the vertices forming the object based on the process results. The drawing section 130 performs rasterization (scan conversion) based on the vertex data after the vertex process, whereby the surface of the polygon (primitive) is associated with pixels. The drawing section 130 then performs a pixel process (fragment process) of drawing pixels forming an image (fragments forming a display screen). In the pixel process, the drawing section 130 determines the final pixel drawing color by performing various processes such as texture reading (texture mapping), color data setting/change, translucent blending, and anti-aliasing, and outputs (draws) the drawing color of the object subjected to perspective transformation to a drawing buffer (buffer which can store image information in pixel units; VRAM or rendering target). Specifically, the pixel process involves a per-pixel process of setting or changing the image information (e.g. color, normal, luminance, and alpha value) in pixel units. This causes an image viewed from the virtual camera (given view point) set in the object space to be generated. When two or more virtual cameras (viewpoints) exist, the image may be generated so that images viewed from the respective virtual cameras can be displayed on one screen as divided images.

The vertex process and the pixel process performed by the drawing section 130 may be implemented by hardware which enables a programmable polygon (primitive) drawing process (i.e. programmable shader (vertex shader and pixel shader)) according to a shader program created using shading language. The programmable shader enables a programmable per-vertex process and per-pixel process to increase the degrees of freedom of the drawing process, thereby significantly improving the representation capability in comparison with a fixed drawing process using hardware.

The drawing section 130 performs a geometric process, texture mapping, hidden surface removal, alpha blending, and the like when drawing the object.

In the geometric process, the object is subjected to coordinate transformation, clipping, perspective projection transformation, light source calculation, and the like. The object data (e.g. object's vertex position coordinates, texture coordinates, color data (luminance data), normal vector, or alpha value) after the geometric process (after perspective transformation) is stored in the storage section 170.

Texture mapping is a process for mapping a texture (texel value) stored in a texture storage section onto the object. In more detail, the drawing section 130 reads a texture (surface properties such as color (RGB) and alpha value) from a texture storage section of the storage section 170 using the texture coordinates set (assigned) to the vertices of the object and the like. The drawing section 130 maps the texture (two-dimensional image) onto the object. In this case, the drawing section 130 performs a process of associating the pixels with the texels, bilinear interpolation (texel interpolation), and the like.

In this embodiment, the drawing section 130 may map a given texture when drawing the object. This allows the color distribution (texel pattern) of the texture mapped onto each object to be dynamically changed.

In this case, textures with different color distributions may be dynamically generated, or textures with different color distributions may be provided in advance and the texture used may be dynamically changed. The color distribution of the texture may be changed in object units.

The drawing section 130 may perform hidden surface removal by a Z buffer method (depth comparison method or Z test) using a Z buffer (depth buffer) in which the Z value (depth information) of the drawing pixel is stored. Specifically, the drawing section 130 refers to the Z value stored in a Z buffer 176 when drawing the drawing pixel corresponding to the primitive of the object. The drawing section 130 compares the Z value stored in the Z buffer 176 with the Z value of the drawing pixel of the primitive. When the Z value of the drawing pixel is a small Z value or the like when viewed from the virtual camera, the drawing section 130 draws the drawing pixel and updates the Z value stored in the Z buffer with a new Z value.

Alpha blending refers to translucent blending (e.g. normal alpha blending, additive alpha blending, or subtractive alpha blending) based on the alpha value (A value). In normal alpha blending, the drawing section 130 calculates a color in which two colors are blended by performing linear interpolation using the alpha value as the degree of blending.

$$RQ=(1-\alpha)\times R1+\alpha\times R2$$

$$GQ=(1-\alpha)\times G1+\alpha\times G2$$

$$BQ=(1-\alpha)\times B1+\alpha\times B2$$

When the blending process is additive alpha blending, the drawing section 120 performs an alpha blending process according to the following expressions.

$$RQ=R1+\alpha\times R2$$

$$GQ=G1+\alpha\times G2$$

$$BQ=B1+\alpha\times B2$$

When the blending process is multiplicative alpha blending, the drawing section 120 performs an alpha blending process according to the following expressions.

$$RQ=\alpha\times R1$$

$$GQ=\alpha\times G1$$

$$BQ=\alpha\times B1$$

When the blending process is multiplicative-additive alpha blending, the drawing section 120 performs an alpha blending process according to the following expressions.

$$RQ=\alpha\times R1+R2$$

$$GQ=\alpha\times G1+G2$$

$$BQ=\alpha\times B1+B2$$

R1, G1, and B1 are R, G, and B components of the color (brightness) of the image (background image) drawn in a drawing buffer 172, and R2, G2, and B2 are R, Q and B components of the color of the object (primitive) to be drawn in the drawing buffer 172. RQ, GQ, and BQ are R, G, and B components of the color of the image obtained by alpha blending.

The alpha value is information which can be stored while being associated with each pixel (texel or dot), such as additional information other than the color information indicating the luminance of each of the R, Q and B color components. The alpha value may be used as mask information, translucency (equivalent to transparency or opacity), bump information, or the like.

The sound generation section 140 processes sound based on the results of various processes performed by the processing section 100, generates game sound such as background music (BGM), effect sound, or voice, and outputs the game sound to the sound output section 192.

The image generation system according to this embodiment may be configured as a system dedicated to a single-player mode in which only one player can play a game, or a system which is also provided with a multiplayer mode in which a number of players can play a game. When a number of players play a game, game images and game sound provided to the players may be generated using one terminal, or may be generated by distributed processing using two or more terminals (game devices or portable telephones) connected through a network (transmission line or communication line), for example.

2. Method According To This Embodiment 2-1. Operation Section

FIGS. 2A and 2B are views showing an example of the operation section according to this embodiment.

FIG. 2A shows the second controller, and FIG. 2B shows the first controller.

The first controller 161 includes the first acceleration sensor 162 (example of movement sensor). The first acceleration sensor 162 detects the acceleration vector of the first controller 161.

The controller 161 also includes a cross key 163, a button 164, and the like.

The second controller 165 includes the second acceleration sensor 166 (example of movement sensor). The second acceleration sensor 166 detects the acceleration vector of the second controller.

The second controller 165 also includes a button 167 and the like.

The first acceleration sensor 162 and the second acceleration sensor 166 detect the acceleration corresponding to the operation, and output the detected acceleration information (output value). The first acceleration sensor 162 and the second acceleration sensor 166 may be implemented by hardware such as a piezoelectric type, electrodynamic type, or strain gauge type acceleration sensor, for example.

The information obtained by the first acceleration sensor 162 and the second acceleration sensor 166 according to this embodiment indicates the acceleration vectors with respect to three axes (X axis, Y axis, and Z axis) in the world coordinate system.

2-2. Vibration Command (Example Of Movement Operation Input) And Vibration Command Display Object (Example of Movement Operation Input Display Object)

A vibration command (example of movement operation input) and a vibration command display object are described below taking a horse racing game as an example.

Figure 3:
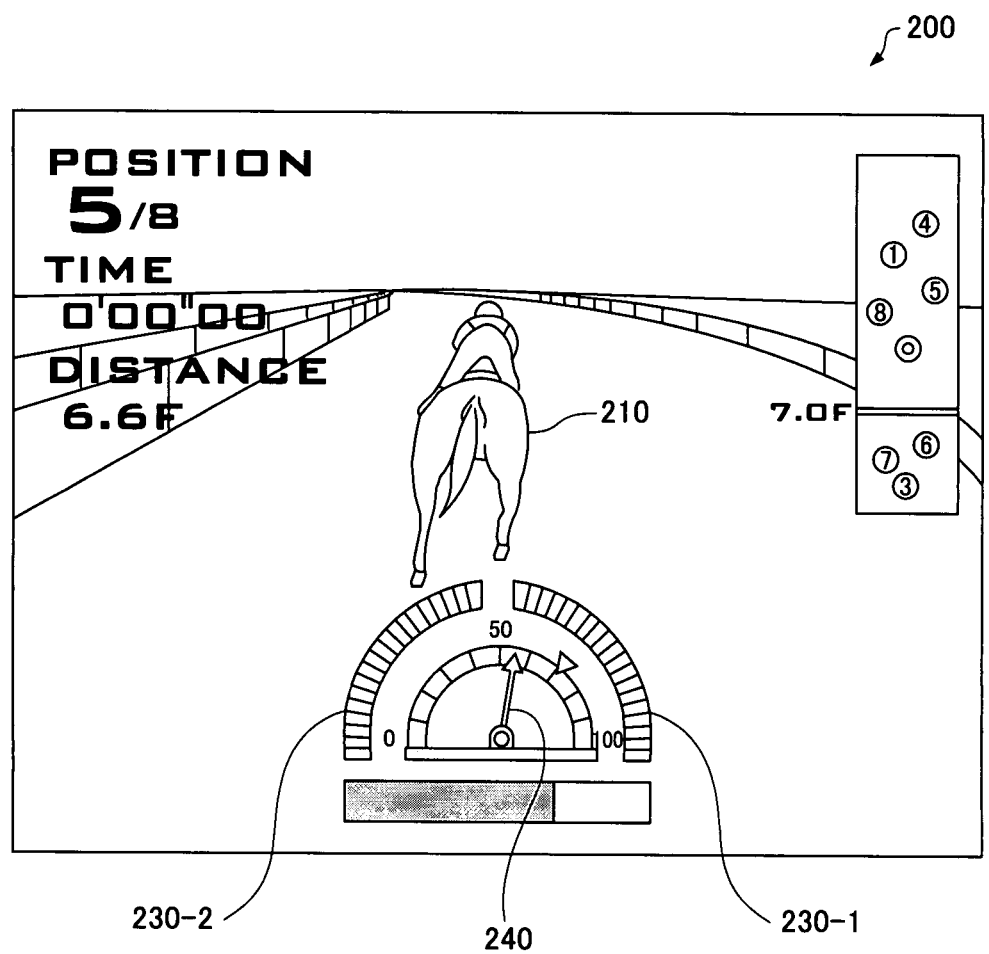
FIG. 3 shows an example of a game image according to one embodiment of the invention.

FIG. 3 shows an example of a game image according to this embodiment.

A reference numeral 210 indicates a game character (racehorse object) operated by the player. In this embodiment, the player plays a game in which the player causes the racehorse (game character) to run based on the operation input from the operation section. An image in which an object space including the running racehorse object is from a virtual camera is generated and displayed as the game image.

Reference numerals 230-1 and 230-2 indicate the vibration command display object for displaying detection of the vibration command. In this example, one vibration command display object is formed of a pair of the objects 230-1 and 230-2. The display state of the vibration command display object changes according to the vibration command executed according to this embodiment, as described later.

The vibration command is a command executed when the output value from the movement sensor (sensor which measures acceleration, velocity, and displacement) provided in at least one of the first controller and the second controller satisfies given vibration command conditions.

A command executed when the output value from the movement sensor (sensor which measures acceleration, velocity, and displacement) provided in at least one of the first controller and the second controller and another operation input value satisfy given vibration command conditions for controlling the movement or motion of the game character is also the vibration command.

The vibration command display object may be set in units of vibration commands, or the display state (e.g. color, shape, blink, and size) of one vibration command display object may be changed corresponding to the type of vibration command.

The vibration command display object may be configured as a three-dimensional object or may be configured as a two-dimensional object (e.g. sprite or planar polygon).

2-3. Acceleration/Deceleration Vibration Command (Example Of Movement Operation Input) and Acceleration/Deceleration Vibration Command Display Object (Example of movement operation input display object)

Figure 4A:
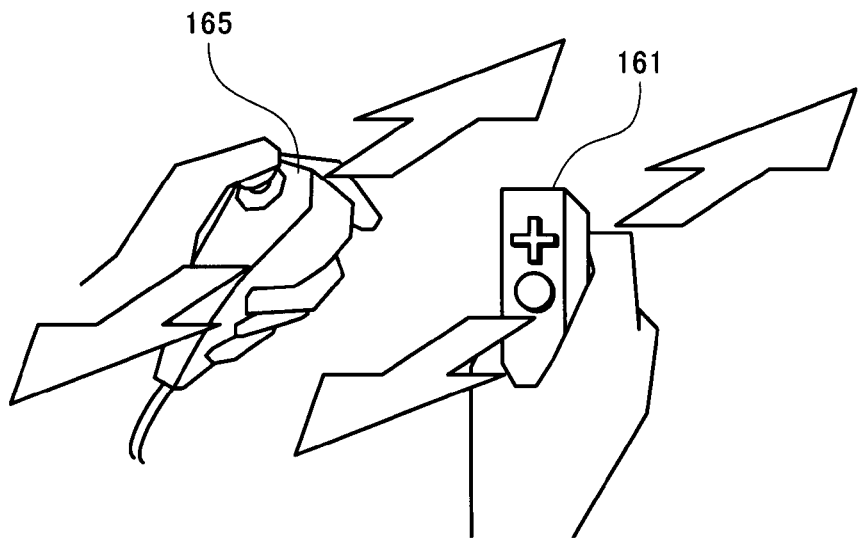
FIGS. 4A and 4B are views illustrative of an input example of a vibration command relating to horse speed control.
Figure 4B:
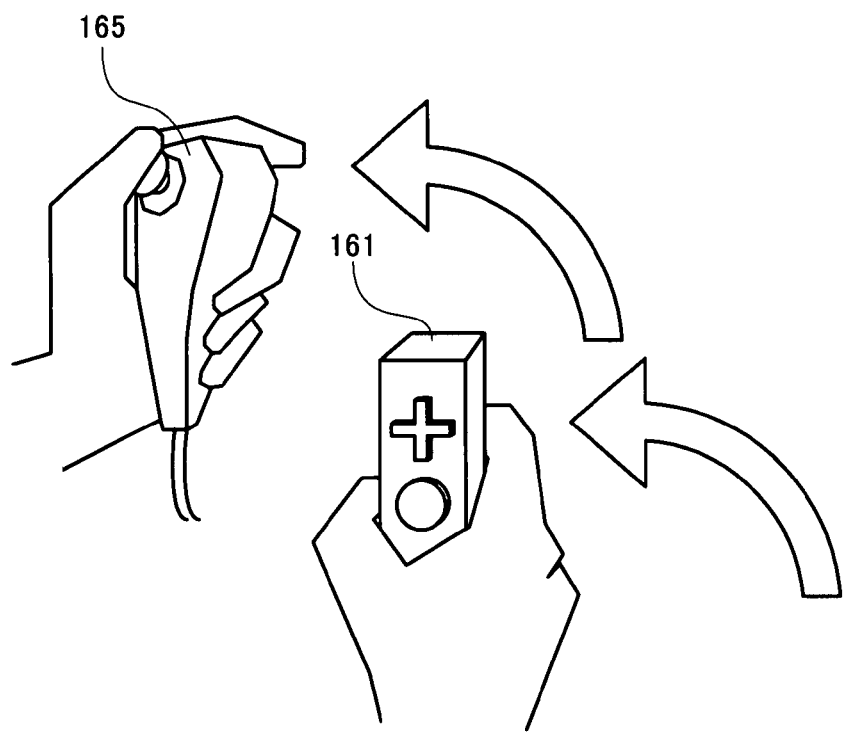
Figure 5A:
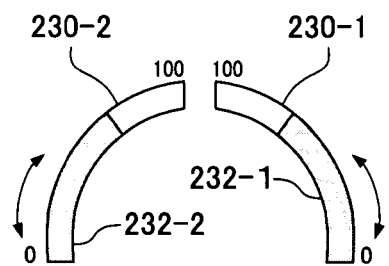
FIGS. 5A and 5B show examples of a vibration command display object relating to horse speed control.
Figure 5B:
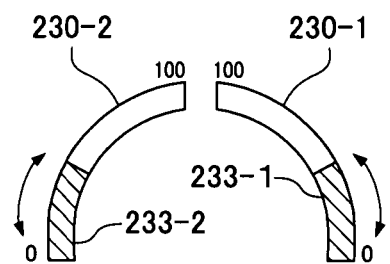

FIGS. 4A and 4B are views illustrative of an input example of the vibration command (example of movement operation input) relating to horse speed control, and FIGS. 5A and 5B show an example of the vibration command display object (example of movement operation input display object) relating to horse speed control.

FIG. 4A shows an operation example of the acceleration vibration command. As shown in FIG. 4A, the player can accelerate the horse (game character) operated by the player by holding the first game controller 161 and the second game controller 165 with the right hand and the left hand, respectively, and simultaneously moving the first game controller 161 and the second game controller 165 in back and forth at the same time.

Specifically, it is determined that the acceleration vibration command has been input when the value detected by the first acceleration sensor provided in the first game controller 161 and the value detected by the second acceleration sensor provided in the second game controller 165 satisfy conditions satisfied when simultaneously moving the first game controller and the second game controller back and forth (acceleration vibration command conditions; see FIG. 12) (detection of acceleration vibration command), and an acceleration process is performed.

For example, when the acceleration vibration command has been detected, a predetermined acceleration a may be applied to the horse as the player's operation target object for a predetermined period. Specifically, an acceleration parameter (example of game parameter for controlling movement or motion of game character) corresponding to the horse as the player's operation target object is set at a for a predetermined period. This enables the player to accelerate the horse as the player's operation target object.

In this embodiment, the player can be informed of detection of the acceleration vibration command by setting the vibration command display object in a predetermined state.

FIG. 5A shows an example of the vibration command display object when the acceleration vibration command has been detected (hereinafter called "acceleration vibration command display object). In this embodiment, when the acceleration vibration command has been detected, indicators of acceleration gauges 232-1 and 232-2 (gauges of color A) of the acceleration vibration command display objects 230-1 and 230 move from 0 to 100 and then return to 0 within a predetermined period of time. Specifically, the player can become aware that the acceleration vibration command has been accepted by the player's operation (operation of simultaneously moving the first controller 161 and the second controller 165 back and forth) from the full movement of the indicator of the gauge of the color A. When the player continuously moves the first controller 161 and the second controller 165 back and forth at the same time, the acceleration vibration command is sequentially detected, and the horse accelerates each time the acceleration vibration command is detected.

FIG. 4B shows an operation example of the deceleration vibration command. As shown in FIG. 4B, the player can decelerate the horse (game character) operated by the player by holding the first game controller 161 and the second game controller 165 with the right hand and the left hand, respectively, and simultaneously raising the first game controller 161 and the second game controller 165.

Specifically, it is determined that the deceleration vibration command has been input when the value detected by the first acceleration sensor provided in the first game controller 161 and the value detected by the second acceleration sensor provided in the second game controller 165 satisfy conditions satisfied when simultaneously raising the first game controller and the second game controller (deceleration vibration command conditions; see FIG. 13) (detection of deceleration vibration command), and a deceleration process is performed.

For example, when the deceleration vibration command has been detected, a predetermined acceleration −b may be applied to the horse as the player's operation target object in the direction opposite to the traveling direction in frame units. Specifically, a deceleration parameter (example of game parameter for controlling movement or motion of game character) corresponding to the horse as the player's operation target object is set at −b for a predetermined period. This enables the player to decelerate the horse as the player's operation target object.

In this embodiment, the player can be informed of detection of the deceleration vibration command by setting the vibration command display object in a predetermined state.

FIG. 5B shows an example of the vibration command display object when the deceleration vibration command has been detected (hereinafter called "deceleration vibration command display object). In this embodiment, when the deceleration vibration command has been detected, indicators of acceleration gauges 233-1 and 233-2 (gauges of color B) of the acceleration vibration command display objects 230-1 and 230 move from 0 to 100 and then return to 0 within a predetermined period of time. Specifically, the player can become aware that the deceleration vibration command has been accepted by the player's operation (operation of simultaneously raising the first controller 161 and the second controller 165) from the full movement of the indicator of the gauge of the color B. When the player continuously raises the first controller 161 and the second controller 165 at the same time, the deceleration vibration command is sequentially detected, and the horse decelerates each time the deceleration vibration command is detected.

2-4. Right/Left-Turn Vibration Command (Example Of Movement Operation Input) And right/left-turn vibration command display object (example of movement operation input display object)

Figure 6A:
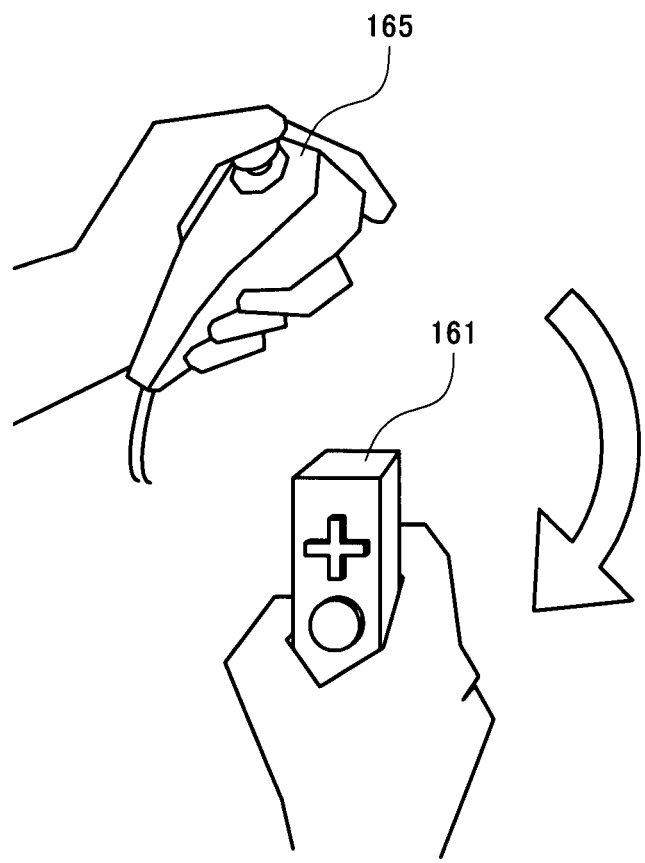
FIGS. 6A and 6B are views illustrative of an input example of a vibration command relating to horse direction control.
Figure 6B:
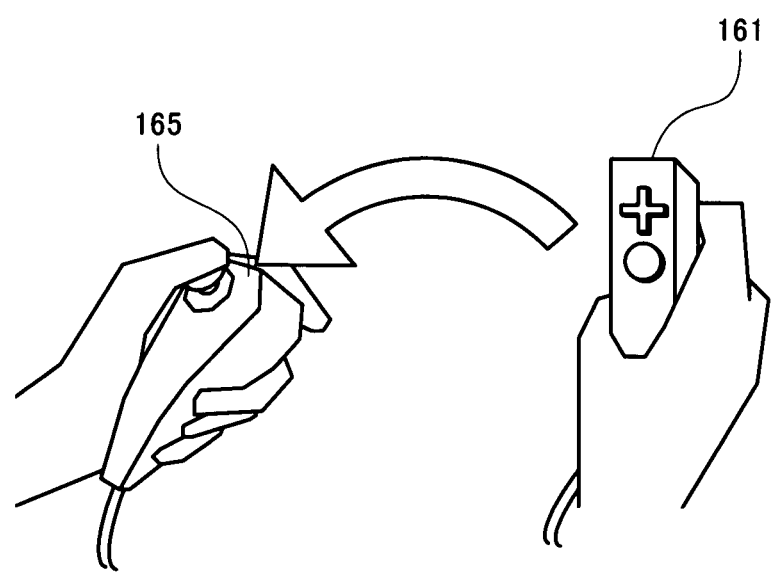
Figure 7A:
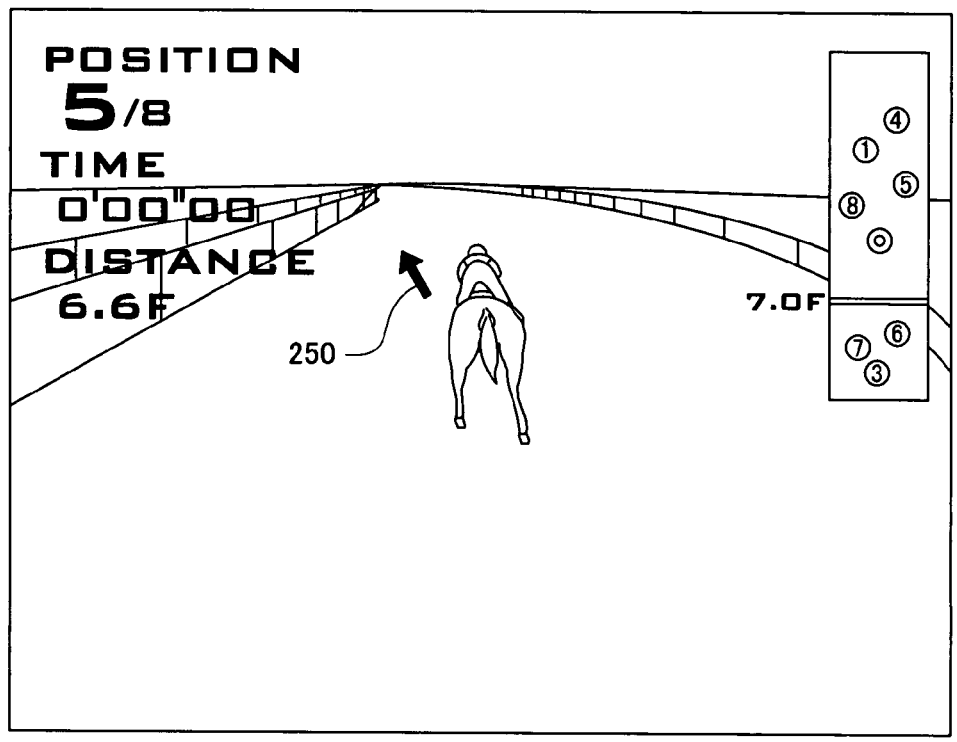
FIGS. 7A and 7B show examples of a vibration command display object relating to horse direction control.
Figure 7B:
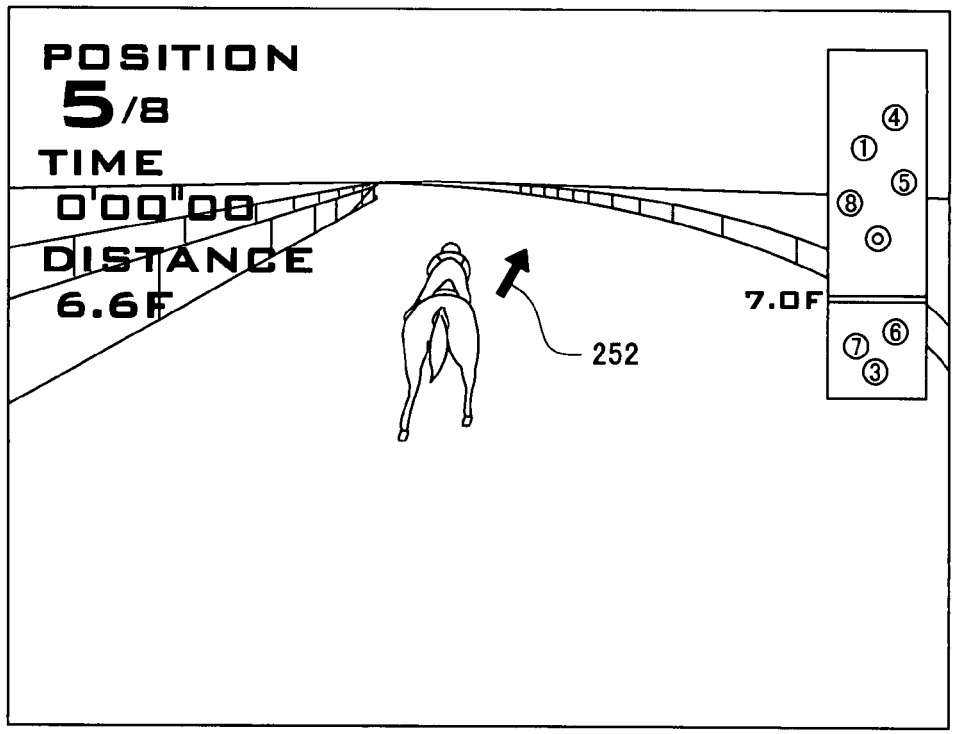

FIGS. 6A and 6B are views illustrative of an input example of the vibration command (example of movement operation input) relating to horse direction control, and FIGS. 7A and 7B show an example of the vibration command display object (example of movement operation input display object) relating to horse direction control.

FIG. 6A shows an operation example of the right-turn vibration command. As shown in FIG. 6A, the player can cause the horse (game character) operated by the player to turn right by pulling the first game controller 161 held with the right hand without moving the second game controller 165 held with the left hand.

Specifically, it is determined that the right-turn vibration command has been input when the value detected by the first acceleration sensor provided in the first game controller 161 and the value detected by the second acceleration sensor provided in the second game controller 165 satisfy conditions satisfied when moving only the first game controller 161 without moving the second game controller 165 (right-turn vibration command conditions) (detection of right-turn vibration command), and a right-turn process is performed.

For example, when the right-turn vibration command has been detected, the traveling direction of the horse as the player's operation target object may be rotated to the right by a predetermined angle c. Specifically, a direction parameter (example of game parameter for controlling movement or motion of game character) corresponding to the horse as the player's operation target object is rotated to the right by the predetermined angle c. This causes the horse as the player's operation target object to turn right. The horse can be caused to turn right or corner clockwise by utilizing this function.

The acceleration value may be calculated based on the acceleration value from the first controller 161, and the right rotation angle may be controlled based on the acceleration value. This allows the player to change the turning angle by pulling the first controller 161 to a large extent or a small extent.

In this embodiment, the player can be informed of detection of the right-turn vibration command by setting the vibration command display object in a predetermined state.

FIG. 6B shows an operation example of the left-turn vibration command. As shown in FIG. 6B, the player can cause the horse (game character) operated by the player to turn left by pulling the second game controller 165 held with the left hand without moving the first controller 161 held with the right hand.

Specifically, it is determined that the left-turn vibration command has been input when the value detected by the first acceleration sensor provided in the first game controller 161 and the value detected by the second acceleration sensor provided in the second game controller 165 satisfy conditions satisfied when moving only the second game controller 165 without moving the first game controller 161 (left-turn vibration command conditions; see FIG. 14) (detection of left-turn vibration command), and a left-turn process is performed.

For example, when the left-turn vibration command has been detected, the traveling direction of the horse as the player's operation target object may be rotated to the left by the predetermined angle c. Specifically, the direction parameter (example of game parameter for controlling movement or motion of game character) corresponding to the horse as the player's operation target object is rotated to the left by the predetermined angle c. This causes the horse as the player's operation target object to turn left. The horse can be caused to turn left or corner counterclockwise by utilizing this function.

The acceleration value may be calculated based on the acceleration value from the second game controller 165, and the left rotation angle may be controlled based on the acceleration value. This allows the player to change the turning angle by pulling the second game controller 165 to a large extent or a small extent.

In this embodiment, the player can be informed of detection of the left-turn vibration command by setting the vibration command display object in a predetermined state.

FIG. 7A shows an example of the vibration command display object when the left-turn vibration command has been detected (hereinafter called "left-turn vibration command display object). In this embodiment, when the left-turn vibration command has been detected, a left-turn vibration command display object 250 is displayed for a predetermined period of time. When controlling the left rotation angle corresponding to the detected acceleration value, the length of the arrow of the left-turn vibration command display object 250 may be changed corresponding to the rotation angle.

The player can become aware that the left-turn vibration command has been accepted by the player's operation (operation of pulling the second game controller 165 without moving the first game controller 161) from the displayed left-turn vibration command display object 250. When the player repeatedly performs the operation of pulling the second game controller 165 without moving the first game controller 161, the left-turn vibration command may be sequentially detected, and the direction of the horse may be rotated to the left each time the left-turn vibration command is detected.

FIG. 7B shows an example of the vibration command display object when the right-turn vibration command has been detected (hereinafter called "right-turn vibration command display object). In this embodiment, when the right-turn vibration command has been detected, a right-turn vibration command display object 252 is displayed for a predetermined period of time. When controlling the right rotation angle corresponding to the detected acceleration value, the length of the arrow of the right-turn vibration command display object 252 may be changed corresponding to the rotation angle.

The player can become aware that the right-turn vibration command has been accepted by the player's operation (operation of pulling the first game controller 161 without moving the second game controller 165) from the displayed right-turn vibration command display object 252.

When the player repeatedly performs the operation of pulling the first game controller 161 without moving the second game controller 165, the right-turn vibration command may be sequentially detected, and the direction of the horse may be rotated to the right each time the left-turn vibration command is detected.

2-5. Whipping Input Vibration Command (Example Of Movement Operation Input) And whipping input vibration command display object (example of movement operation Input display object)

Figure 8:
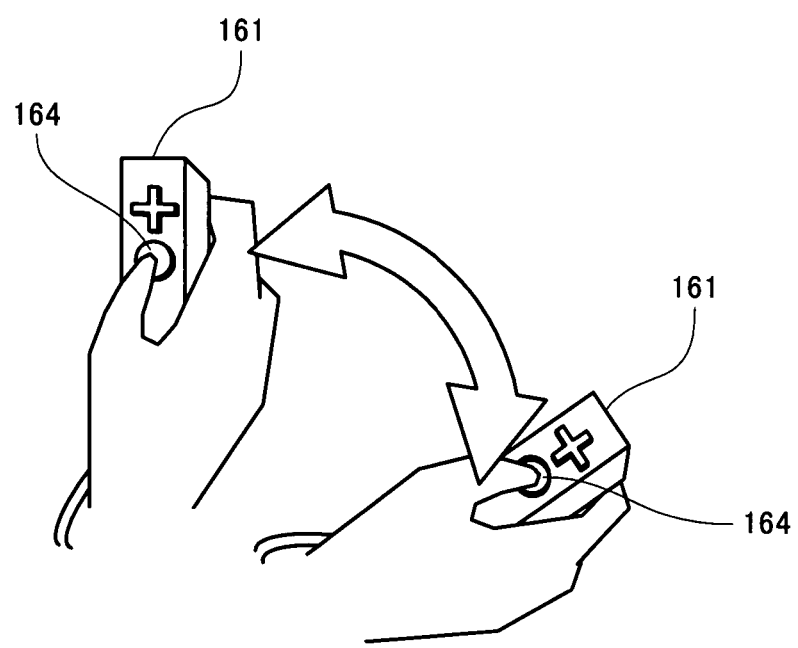
FIG. 8 shows an input example of another vibration command relating to horse speed control (hereinafter called "whipping input vibration command").
Figure 9:
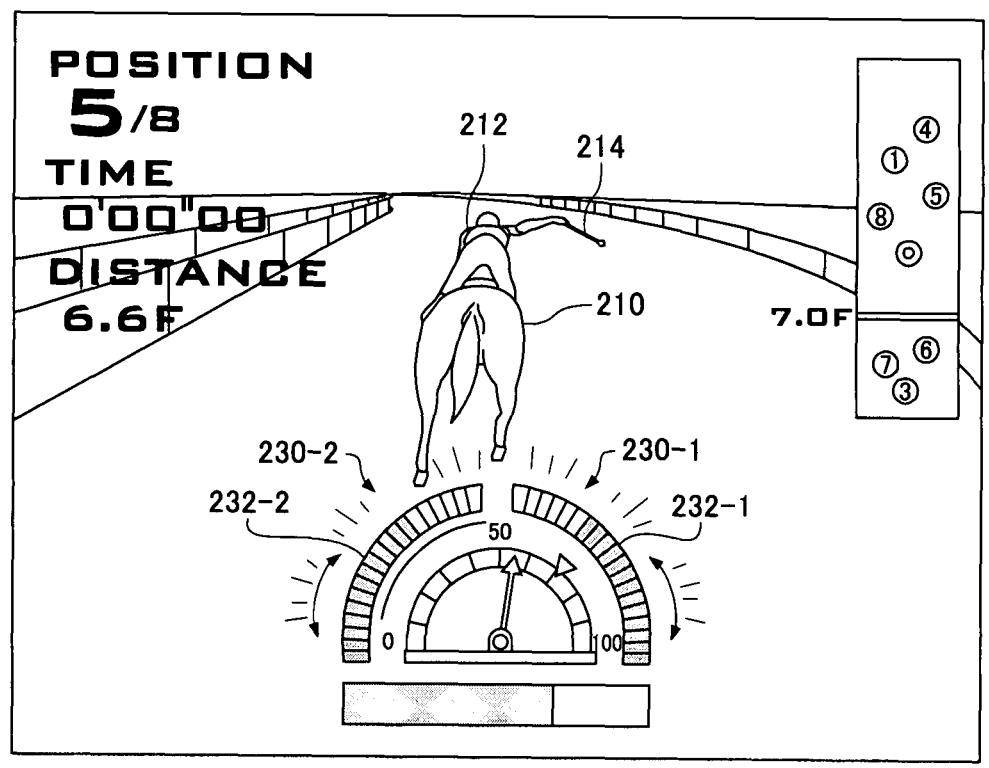
FIG. 9 shows an example of a game image when the whipping input vibration command is executed.

FIG. 8 is a view illustrative of an input example of another vibration command (example of movement operation input)

relating to horse speed control (hereinafter called "whipping input vibration command"), and FIG. 9 shows an example of the game image when the whipping input vibration command is executed.

FIG. 8 shows an operation example of the whipping input vibration command. As shown in FIG. 8, the player can cause a game character jockey 212 operated by the player to strike a horse 210 (game character) operated by the player with a whip 214 by shaking the first game controller 161 held with the right hand while pressing the button 164 of the first game controller 161, thereby causing the horse to significantly accelerate.

Specifically, it is determined that the whipping input vibration command has been input when the value detected by the first acceleration sensor provided in the first game controller 161 and a press signal of the button 164 of the first game controller 161 satisfy conditions satisfied when shaking the first game controller 161 while pressing the button 164 of the first game controller 161 (whipping input vibration command conditions; see FIG. 15) (detection of whipping input vibration command), and a whipping input process is performed.

For example, when the whipping input vibration command has been detected, a predetermined acceleration e (e>a) may be applied to the horse as the player's operation target object for a predetermined period. Specifically, the acceleration parameter (example of game parameter for controlling movement or motion of game character) corresponding to the horse as the player's operation target object is set at a value e several times the normal acceleration a for a predetermined period. This enables the player to rapidly accelerate the horse as the player's operation target object.

In this embodiment, the player can be informed of detection of the whipping input vibration command by setting the vibration command display object in a predetermined state.

FIG. 9 shows an example of the game image when the whipping input vibration command is detected.

In this embodiment, when the whipping input vibration command has been detected, the indicators of the acceleration gauges 232-1 and 232-2 (gauges of color A) of the acceleration vibration command display objects 230-1 and 230 move from 0 to 100 and then return to 0 within a predetermined period of time, and the acceleration vibration command display objects 230-1 and 230-2 blink. This allows the player to become aware that the whipping input vibration command has been accepted by the player's operation (operation of shaking the first game controller 161 while pressing the button 164).

When the whipping input vibration command has been detected, the game character jockey 212 operated by the player makes a motion of striking the horse 210 with the whip 214.

2-6. Method Of Detecting Vibration Command (Example Of Movement Operation Input)

An example is described below in which the acceleration value of each of three axes (X axis, Y axis, and Z axis) is detected using an acceleration sensor as the movement sensor, and whether or not the vibration command conditions are satisfied is determined based on the acceleration values of the three axes.

Figure 10A:
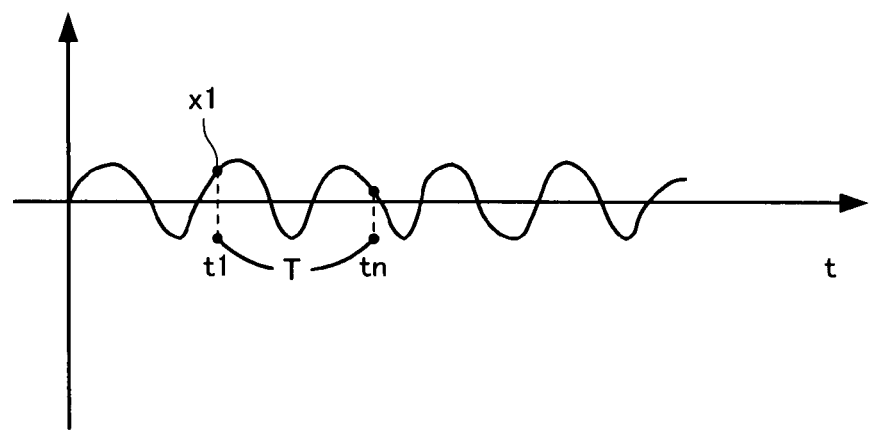
FIGS. 10A to 10C are graphs showing changes in acceleration values (i.e. output values from acceleration sensor) of the X axis, the Y axis, and the Z axis, respectively.
Figure 10B:
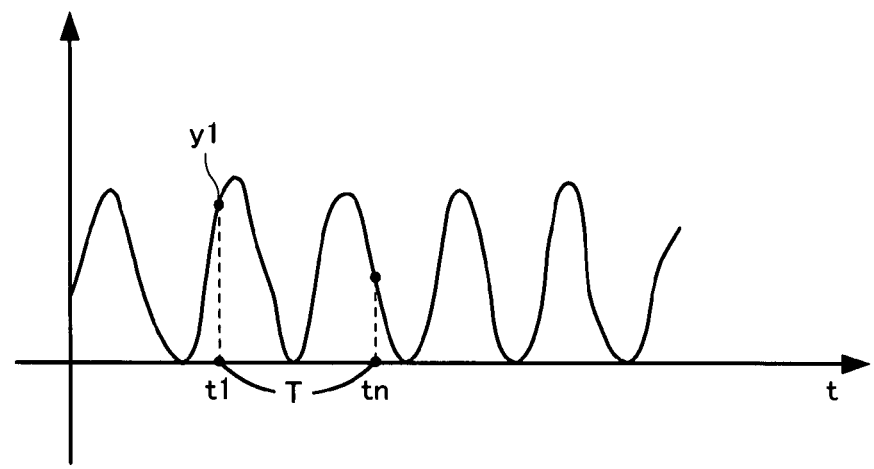
Figure 10C:
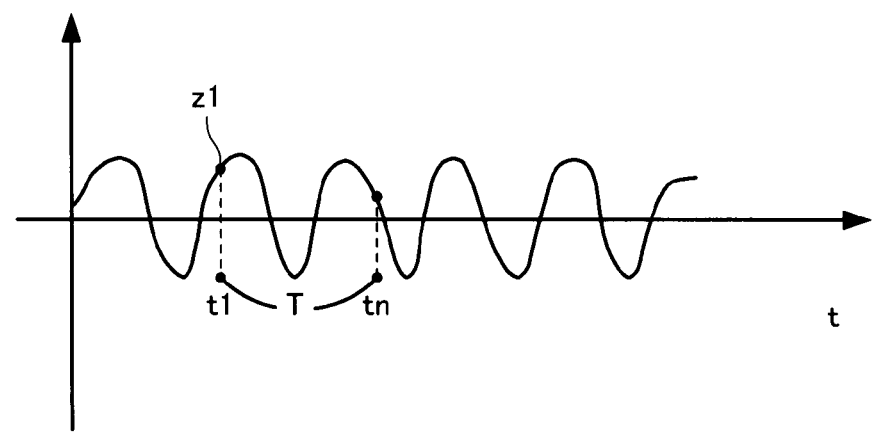

FIGS. 10A to 10C are graphs showing changes in acceleration values (i.e. output values from acceleration sensor) of the X axis, the Y axis, and the Z axis, respectively.

In this embodiment, whether or not the first controller is shaken may be determined by determining whether or not the acceleration value becomes equal to or greater than a predetermined value in a predetermined period T, for example.

The acceleration value may be determined based on the acceleration of each of the X axis, the Y axis, and the Z axis at a time t. For example, when the acceleration value of the X axis at a time t1 is x1, the acceleration value of the Y axis at the time t1 is y1, and the acceleration value of the Z axis at the time t1 is z1, an acceleration value k1 at the time t may be calculated by the following expression.

$$k_1 = \sqrt{x_1^2 + y_1^2 + z_1^2}$$

Whether or not the acceleration value has become equal to or greater than a predetermined value in the period T may be determined by calculating the average value of the acceleration values in the period T (t1 to tn) and determining whether or not the average value has become equal to or greater than a predetermined value.

For example, when the posture of the controller affects determination as the vibration command condition (e.g. when whether or not the controller has been raised is determined as in the case of the deceleration vibration command), an arc tangent (Y/Z) may be obtained based on the acceleration value y of the Y axis and the acceleration value z of the Z axis.

2-7. Reaction Input Recognition Prevention Method

Figure 11:
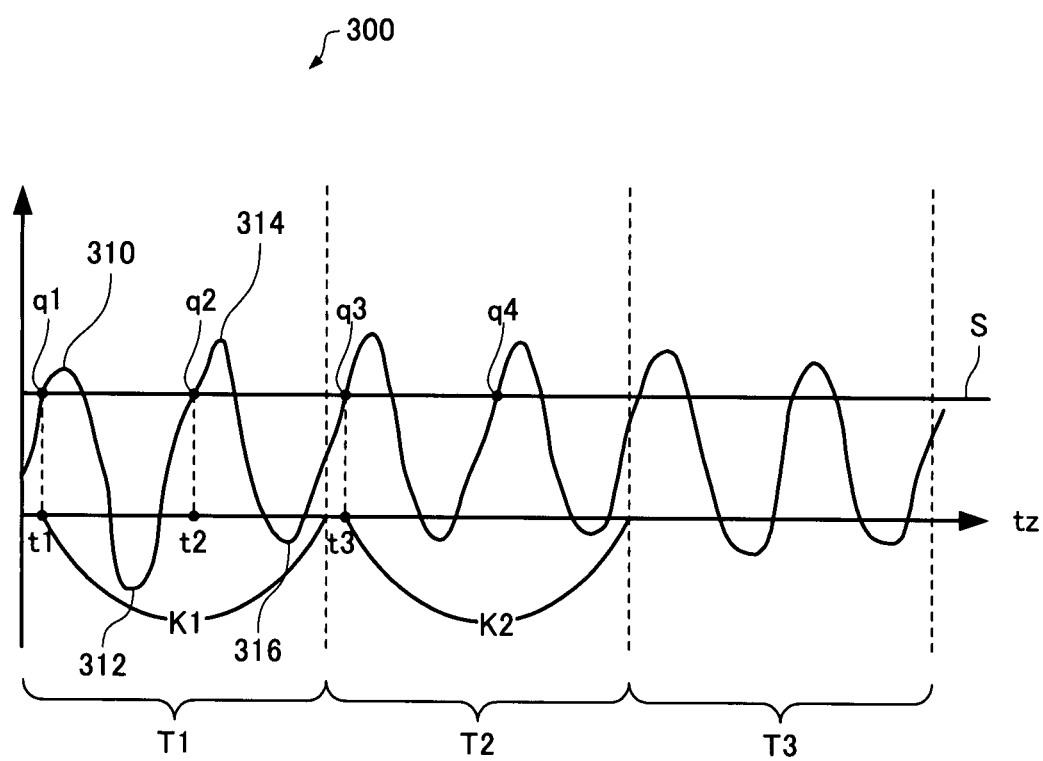
FIG. 11 is a graph illustrative of a reaction input recognition prevention method according to one embodiment of the invention.

FIG. 11 is a graph illustrative of a reaction input recognition prevention method according to this embodiment. A reference numeral 300 indicates a temporal change in acceleration value detected by the acceleration sensor with respect to a given axis when the user shakes the controller including the acceleration sensor. When the user moves the controller back and forth once in each of periods T1, T2, and T3, four pulses are generated in each of the periods T1, T2, and T3. For example, four pulses having the extreme values indicated by 310, 312, 314, and 316 are generated in the period T1. The pulses having the extreme values indicated by 314 and 316 are pulses which occur as the reaction inputs of the pulses having the extreme values indicated by 310 and 312.

For example, when detecting that the controller is shaken on condition that the acceleration value is equal to or greater than a predetermined value, a predetermined threshold value S is set, and one vibration command is detected when the detected acceleration value exceeds the threshold value S. Specifically, the vibration command may be detected when an acceleration value q1 exceeds the threshold value S at a time t1 in the period T1.

In this embodiment, another vibration command is not detected for a predetermined period of time after the vibration command has been detected (e.g. for a period k1 after the vibration command has been detected at the time t1). Therefore, the next vibration command is detected at a time t3 at which the first acceleration value detected after the expiration of the predetermined period of time exceeds the threshold value S.

Therefore, another vibration command is not detected at a time t2 although an acceleration value q2 exceeds the threshold value S. One vibration command can be detected corresponding to one shaking operation without detecting the pulse due to the reaction input by setting the period in which the vibration command is not recognized (command recognition prohibition period) based on the four-pulse cycle.

The duration of the period in which another vibration command is not detected may be appropriately set at a value differing from that of the above example. For example, when detecting the command in h second units, h' seconds (h' is appropriately set depending on the transition properties of the acceleration value and the time h) after the command has been detected may be set as the command recognition prohibition period.

2-8. Acceleration Vibration Command Detection Process

Figure 12:
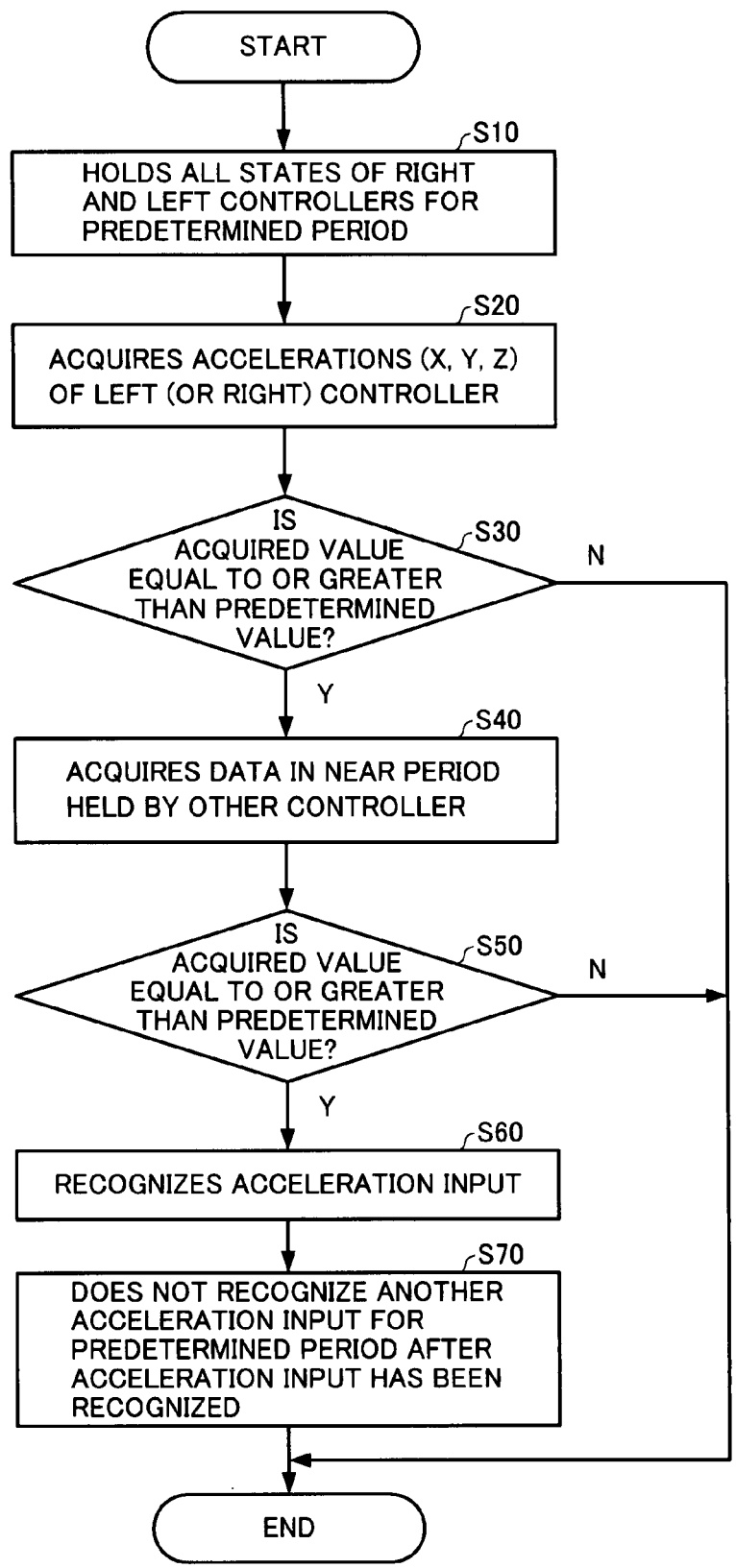
FIG. 12 is a flowchart showing the flow of an acceleration vibration command detection process.

FIG. 12 is a flowchart showing the flow of an acceleration vibration command detection process.

All states (detected acceleration value and input signal from other operation sections (e.g. button)) of the right and left controllers (right controller: first controller, left controller: second controller) are held for a predetermined period (step S10).

The accelerations (X, Y, Z) of the left (or right) controller are acquired (step S120).

Whether or not the acquired value is equal to or greater than a predetermined value is determined (step S30). When the acquired value is equal to or greater than a predetermined value, the data in the near period held by the other controller is acquired (step S40).

Whether or not the value acquired from the other controller is equal to or greater than a predetermined value is determined (step S50). When the acquired value is equal to or greater than a predetermined value, it is recognized that an acceleration input has been performed (step S60).

Another acceleration input is not recognized for a predetermined period after the acceleration input has been recognized (step S70). This prevents detection of the reaction input. All vibration commands may not be recognized for a predetermined period after the acceleration input has been recognized.

2-9. Deceleration Vibration Command Detection Process

Figure 13:
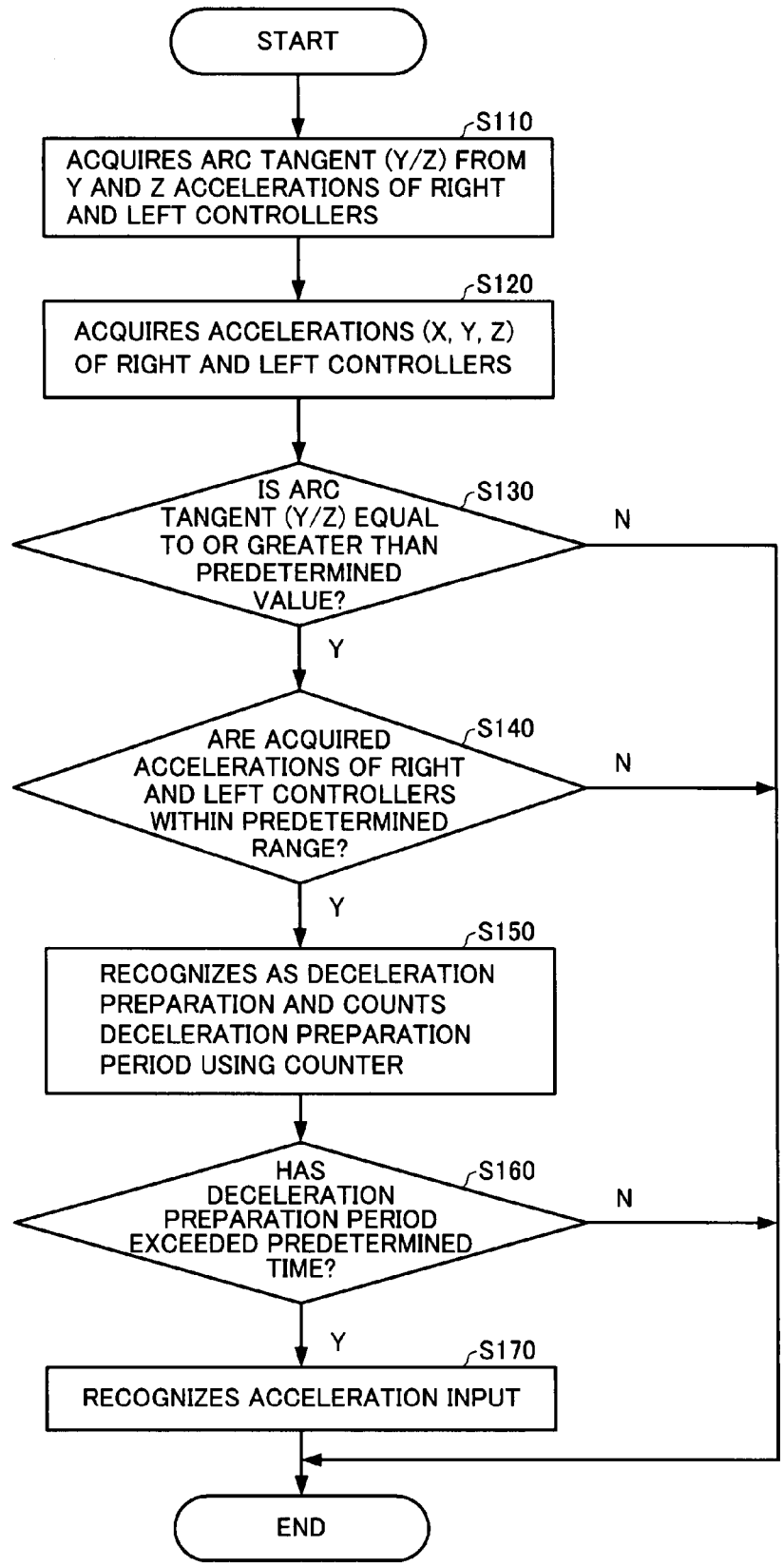
FIG. 13 is a flowchart showing the flow of a deceleration vibration command detection process.

FIG. 13 is a flowchart showing the flow of a deceleration vibration command detection process.

The arc tangent (Y/Z) is acquired from the Y and Z accelerations of the right and left controllers (step S110).

The accelerations (X, Y, Z) of the right and left controllers are acquired (step S220).

Whether or not the arc tangent (Y/Z) is equal to or greater than a predetermined value is determined (step S130). When the arc tangent (Y/Z) is equal to or greater than a predetermined value, whether or not the acquired accelerations of the right and left controllers are within a predetermined range is determined (step S140). When the acquired accelerations are within a predetermined range (deceleration preparation), the deceleration preparation period is counted using a counter (step S150).

Whether or not the deceleration preparation period has exceeded a predetermined time is determined (step S160). When the deceleration preparation period has exceeded a predetermined time, it is recognized that an acceleration input has been performed (step S170). This prevents a situation in which the character is decelerated merely when the arc tangent (Y/Z) value momentarily becomes equal to or greater than a predetermined value and the accelerations of the right and left controllers fall within a predetermined range. All vibration commands may not be recognized for a predetermined period after the deceleration input has been recognized.

2-10. Left-Turn Vibration Command Detection Process

Figure 14:
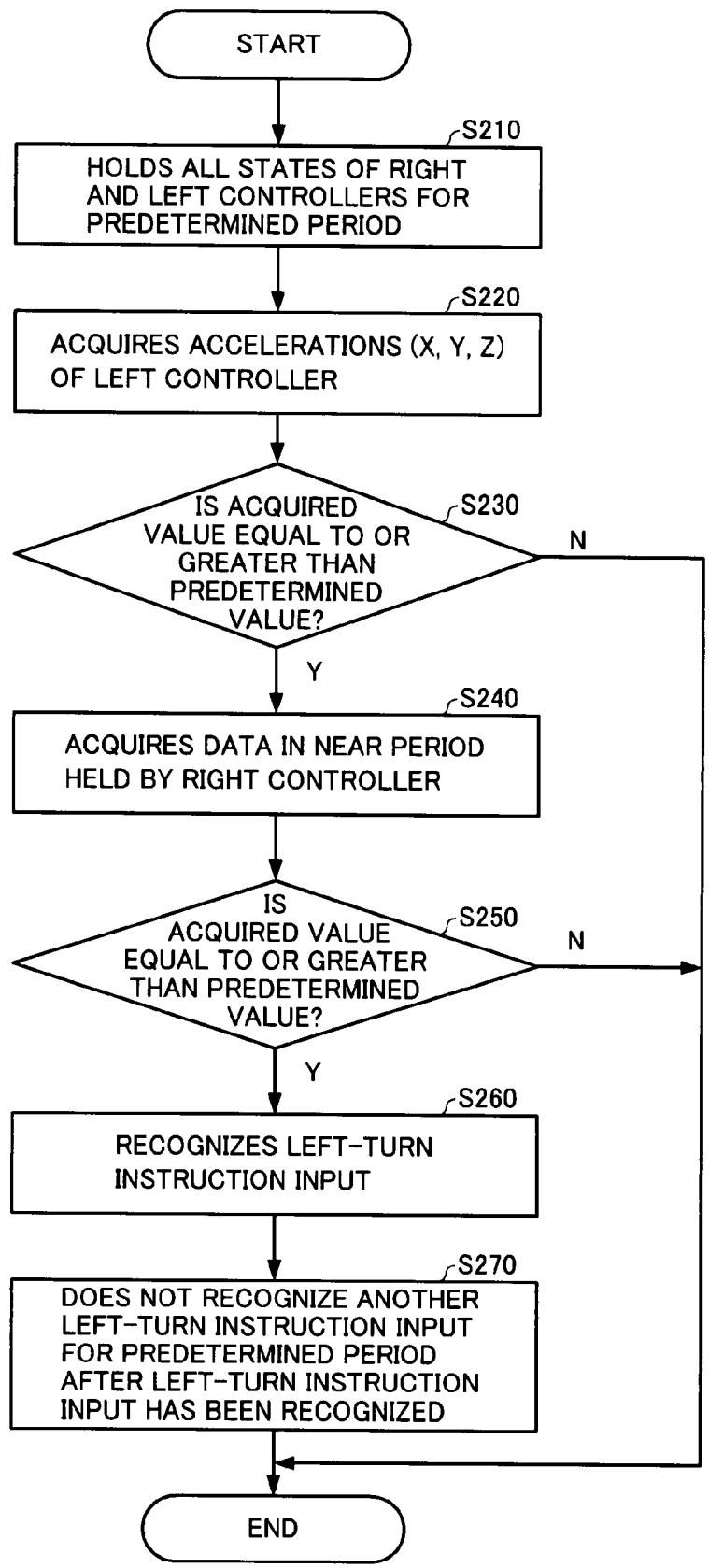
FIG. 14 is a flowchart showing the flow of a left-turn vibration command detection process.

FIG. 14 is a flowchart showing the flow of a left-turn vibration command detection process.

All states of the right and left controllers are held for a predetermined period (step S210).

The accelerations (X, Y, Z) of the left controller are acquired (step S220).

Whether or not the acquired value is equal to or greater than a predetermined value is determined (step S230). When the acquired value is equal to or greater than a predetermined value, the data in the near period held by the right controller is acquired (step S240).

Whether or not the value acquired from the right controller is equal to or less than a predetermined value is determined (step S250). When the acquired value is equal to or less than a predetermined value, it is recognized that a left-turn instruction input (left-turn vibration command) has been performed (step S260).

Another left-turn instruction input is not recognized for a predetermined period after the left-turn instruction input has been recognized (step S270). This prevents detection of the reaction input. All vibration commands may not be recognized for a predetermined period after the left-turn vibration command has been recognized.

2-11. Whipping Input Vibration Command Detection Process

Figure 15:
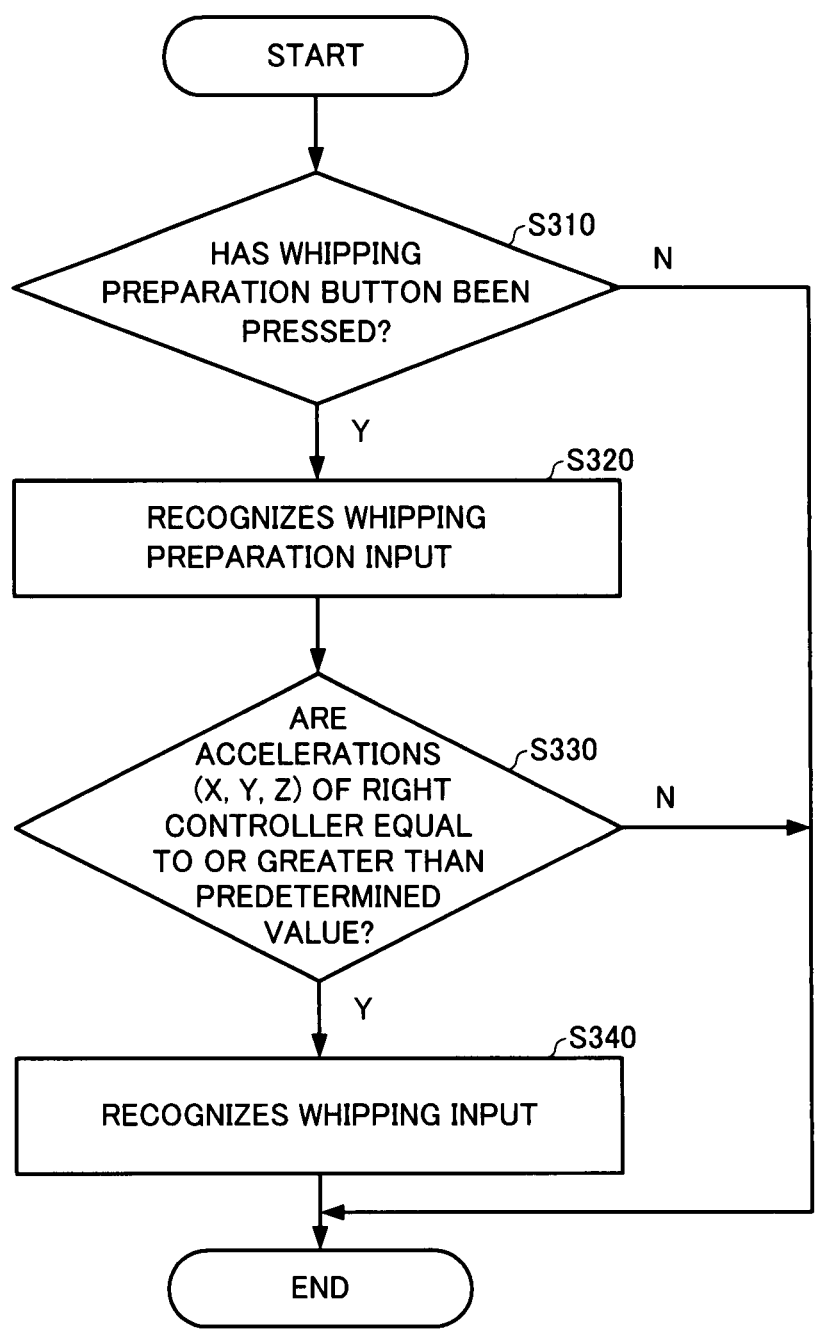
FIG. 15 is a flowchart showing the flow of a whipping input vibration command detection process.

FIG. 15 is a flowchart showing the flow of a whipping input vibration command detection process.

Whether or not a predetermined whipping preparation button has been pressed is determined (step S310). When the whipping preparation button has been pressed, it is recognized that a whipping preparation input has been performed (step S320).

Whether or not the accelerations (X, Y, Z) of the right controller (first controller) are equal to or greater than a predetermined value is determined (step S330). When the accelerations are equal to or greater than a predetermined value, it is recognized a whipping input has been performed (step S340).

2-12. Process of Displaying Detection of Vibration Command as Vibration Command Display Object (Example of Movement Operation Input Display Object)

Figure 16:
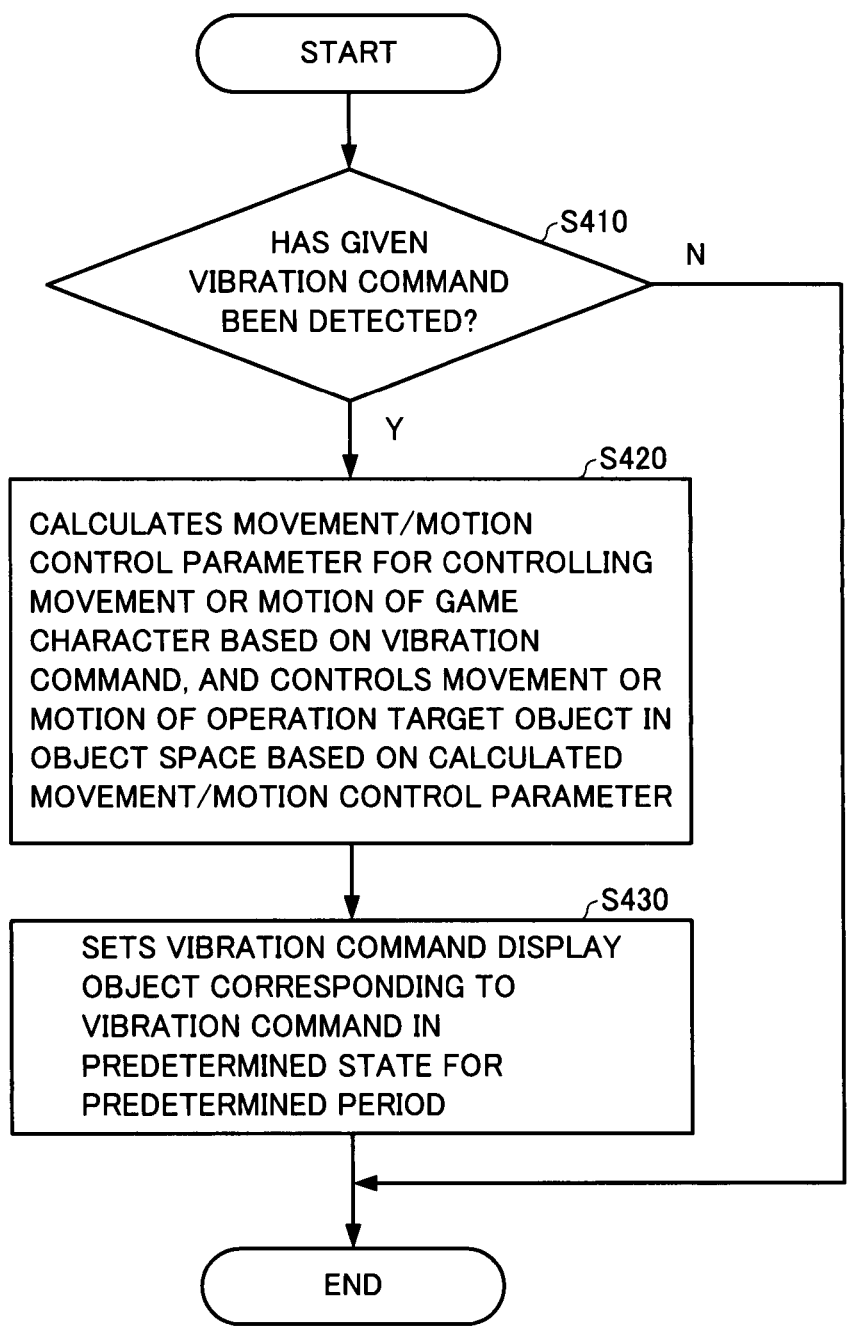
FIG. 16 is a flowchart showing the flow of a display control process of displaying a vibration command display object.

FIG. 16 is a flowchart showing the flow of the display control process of displaying the vibration command display object.

Whether or not a given vibration command has been detected is determined (step S410). When the given vibration command has been detected, the game parameter for controlling the movement or motion of the game character is calculated based on the vibration command, and the movement or motion of the operation target object in the object space is controlled based on the calculated game parameter (step S420).

The vibration command display object corresponding to the vibration command is set in a predetermined state for a predetermined period (step S430).

2-13. Calibration Adjustment Process

Figure 21A:
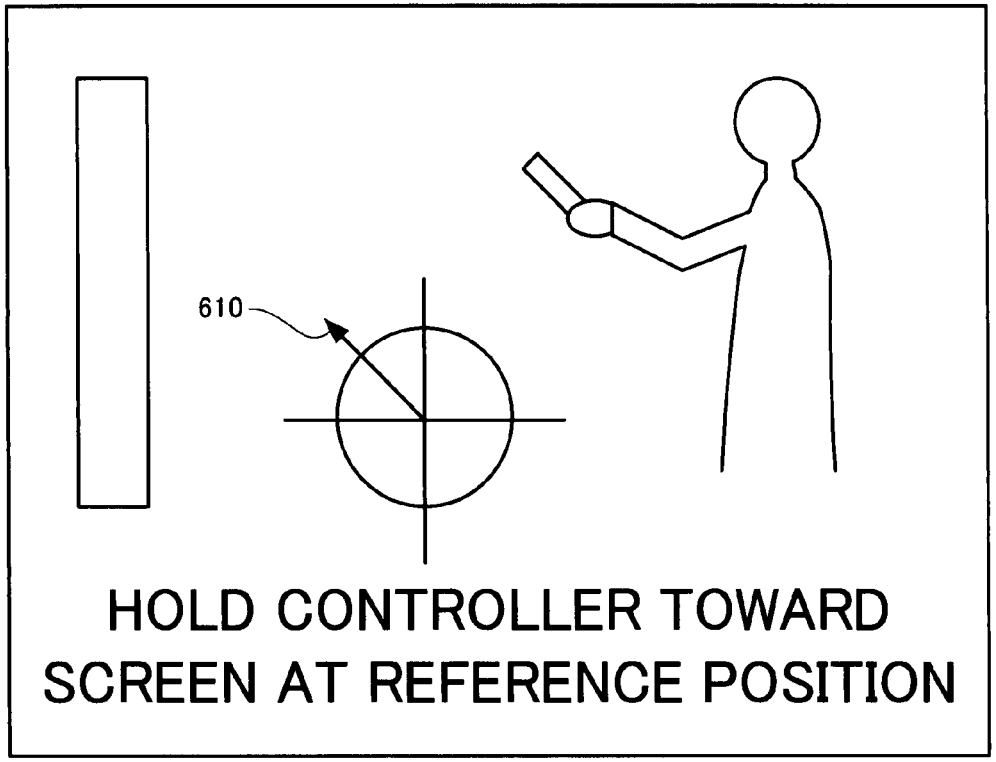
FIGS. 21A and 21B are views illustrative of an example of a game screen for a calibration adjustment process.
Figure 21B:
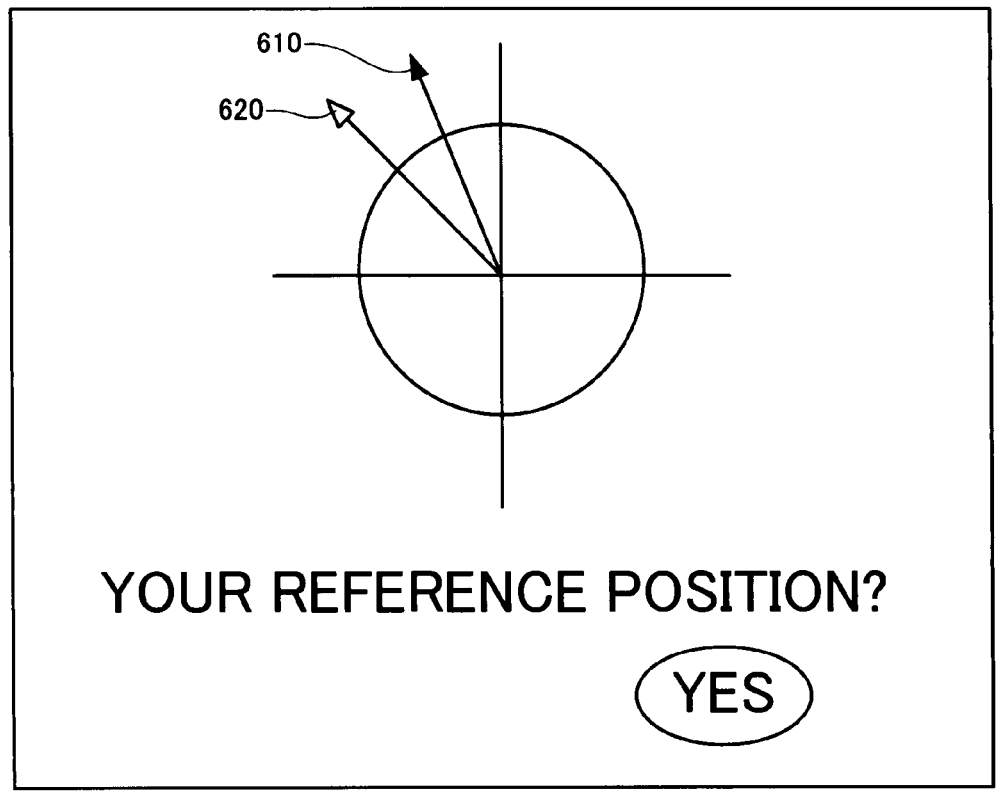

FIGS. 21A and 21B are views illustrative of an example of a game screen for a calibration adjustment process.

For example, when the player has selected an initial setting mode, an initial setting screen shown in FIG. 21A is displayed. In the initial setting screen, an image is displayed which presents a message such as "Hold the controller toward the screen at the reference position" to the user or shows an example in which a person holds the controller toward the screen at the reference position, and the initial setting period is set.

A reference numeral 610 indicates an arrow image showing the inclination of the controller when the user holds the controller at the reference position according to the example.

When the player holds the controller according to the example during the initial setting period, an image shown in FIG. 21B is displayed. A reference numeral 620 indicates an arrow image showing the inclination of the controller when user holds the controller at the reference position. The inclination of the arrow image 620 is provided based on the output value from the acceleration sensor provided in the controller during the initial setting period. In FIG. 21, the arrow image 620 of the player differs to some extent from the arrow image of the reference position. This means that the default initial setting value of the system set corresponding to the reference position differs from the initial setting value corresponding to the reference position of the player.

A message stating "Your reference position?" is output. When the player has performed a decision input while a YES button image 630 blinks, the reference position of the player is set at the position 620.

In this embodiment, the setting value as the detection condition for the movement operation input is adjusted based on the reference position input by the player.

Figure 17:
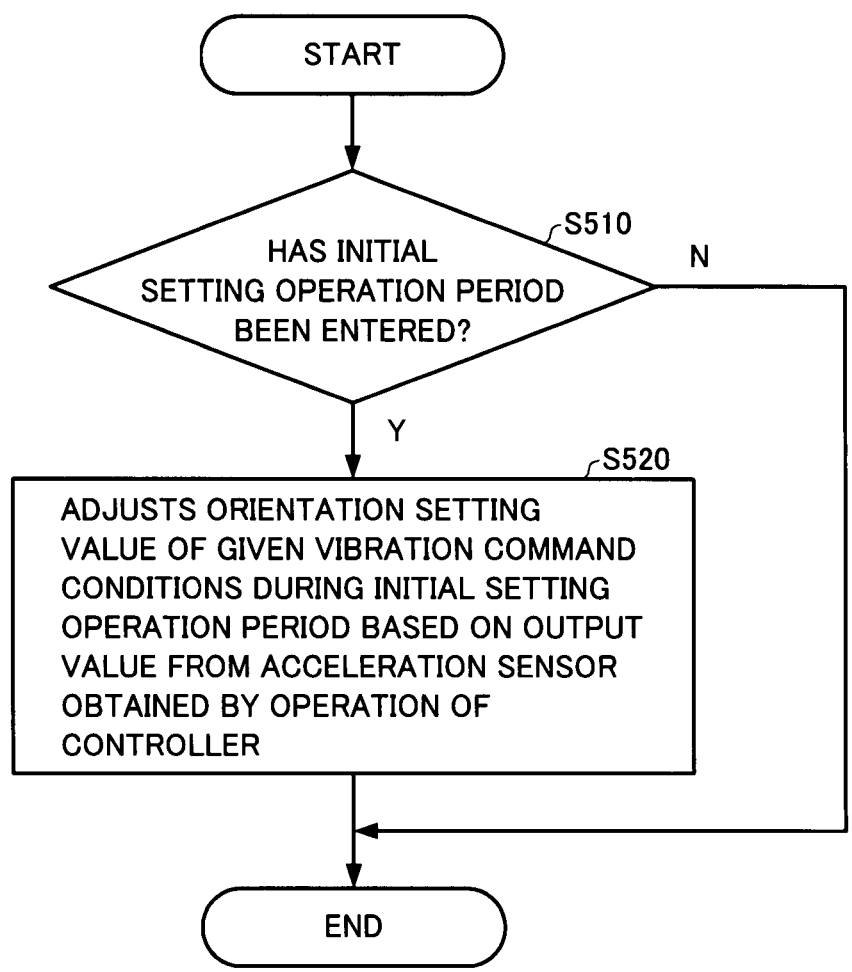
FIG. 17 is a flowchart showing the flow of a calibration process.

FIG. 17 is a flowchart showing the flow of the calibration adjustment process.

Whether or not the initial setting operation period has been entered is determined (step S510). When the initial setting operation period has been entered, the orientation setting value of given vibration command conditions is adjusted based on the output value from the acceleration sensor obtained by the operation of the controller (step S520).

The initial setting period may be set before starting the game.

In the initial setting period, the user holds the controller at the reference position in the basic posture, and the output value from the acceleration sensor is acquired. For example, even if the basic posture and the reference position are determined in advance and the user holds the controller at the reference position in the basic posture, the inclination of the held controller and the like differ to some extent depending on the user.

According to this embodiment, when the orientation is included in the vibration command conditions, the orientation can be determined as an offset from the reference position set for each user, whereby the difference in reference position, which differs to some extent depending on the user, can be absorbed.

For example, the user performs the shaking movement in the initial setting period, and the output value from the acceleration sensor is acquired. Since the cycle, velocity, strength, and amplitude of the shape operation differ depending on the user, a change in the detected acceleration value also differs depending on the user.

According to this embodiment, when the acceleration value is included in the vibration command conditions, the threshold value used when determining the acceleration value may be set for each user based on the acceleration value detected during the initial setting period.

The invention is not limited to the above-described embodiments. Various modifications and variations may be made. Any term (e.g. frame buffer/work buffer, alpha value, and lookup table) cited with a different term (e.g. drawing region, pixel value, and conversion table) having a broader meaning or the same meaning at least once in the specification and the drawings can be replaced by the different term in any place in the specification and the drawings.

The above embodiments have been described taking an example of using an acceleration sensor as the movement sensor. Note that the invention is not limited thereto. For example, the movement sensor may be formed using a velocity sensor, a sensor which measures displacement, or the like.

The above embodiments have been described taking an example of detecting the acceleration values of the three axes using the acceleration sensor. Note that the invention is not limited thereto. For example, the acceleration values of two axes or one axis may be detected.

The above embodiments have been described taking a horse racing game as an example. Note that the invention may be applied to various other games. For example, the invention may be applied to a ball game (e.g. baseball), a musical instrument performance game, a fighting game, and the like.

Figure 20A:
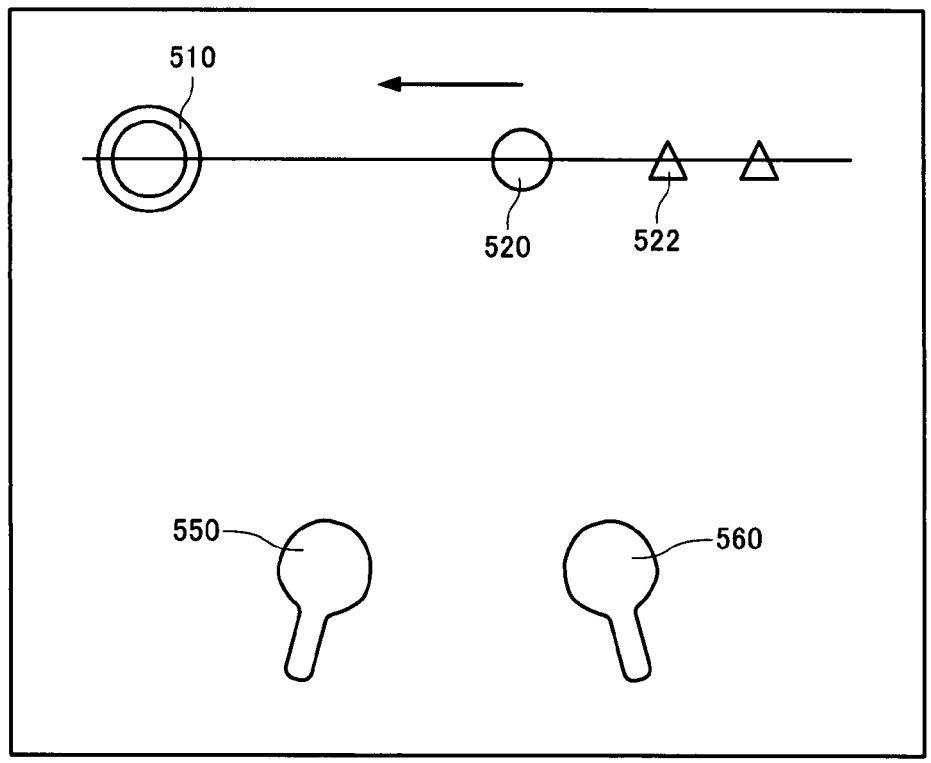
FIGS. 20A and 20B are views illustrative of an example of a movement operation input display command in a performance game.
Figure 20B:
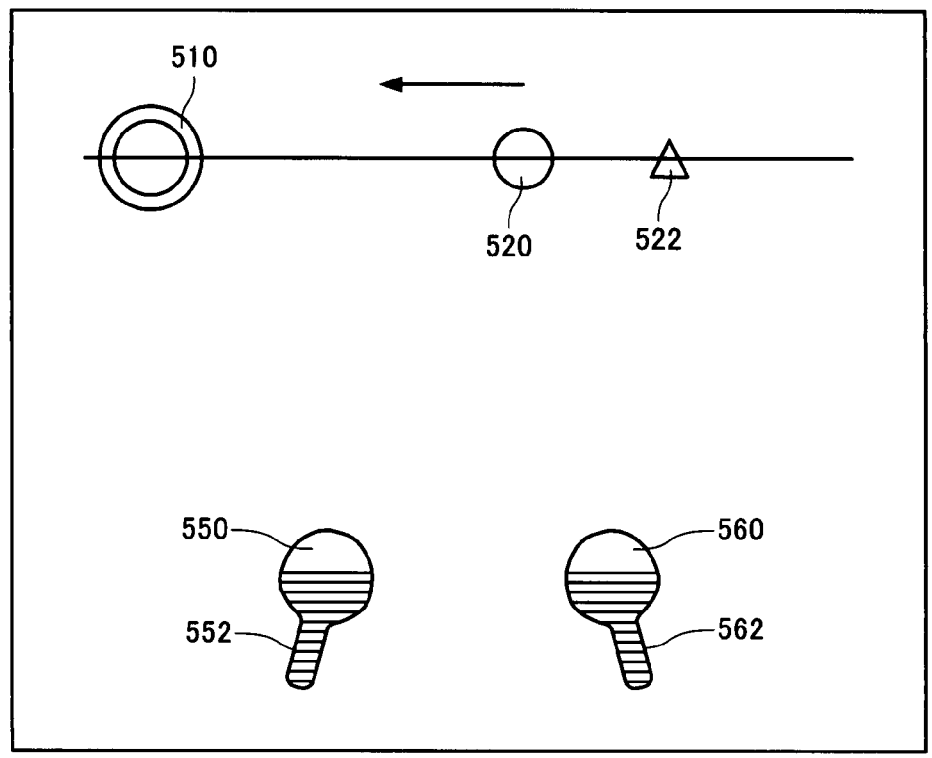

FIGS. 20A and 20B are views illustrative of an example of a movement operation input display command in a performance game.

FIGS. 20A and 20B show game images of a performance game in which the player performs an operation input by moving a controller imitating a pair of maracas. A game image is displayed in which direction marks 520 and 522 approach a stationary reference mark 510. The reference numeral 520 indicates a left maraca operation direction mark, and the reference numeral 522 indicates a right maraca operation direction mark. The player holds a right maraca controller with the right hand and a left maraca controller with the left hand, and performs the game by shaking the maracas held with the left hand or the right hand at a timing at which the left maraca operation direction mark 520 or the right maraca operation direction mark approaching the reference mark according to the tune overlaps the reference mark 510.

A reference numeral 550 indicates a movement operation input display command corresponding to the left maraca controller, and a reference numeral 560 indicates a movement operation input display command corresponding to the right maraca controller.

When the player has shaken the left maraca controller, a gauge 552 indicating that the left maraca controller has been shaken may be displayed for a predetermined period, as indicated by 550 in FIG. 20B (e.g. an image may be displayed in which the indicator of the gauge moves vertically for a predetermined period).

When the player has shaken the right maraca controller, a gauge 562 indicating that the left maraca controller has been shaken may be displayed for a predetermined period, as indicated by 560 in FIG. 20B (e.g. an image may be displayed in which the indicator of the gauge moves vertically for a predetermined period).

The movement operation input detection section may determine whether or not given vibration command conditions are satisfied based on the output value from the first movement sensor provided in the first controller and the output value from the second movement sensor provided in the second controller, and the operation input display control section may perform the display control process for displaying detection of the vibration command using a first movement operation input display object associated with the first controller and a second movement operation input display object associated with the second controller.

Figure 18A:
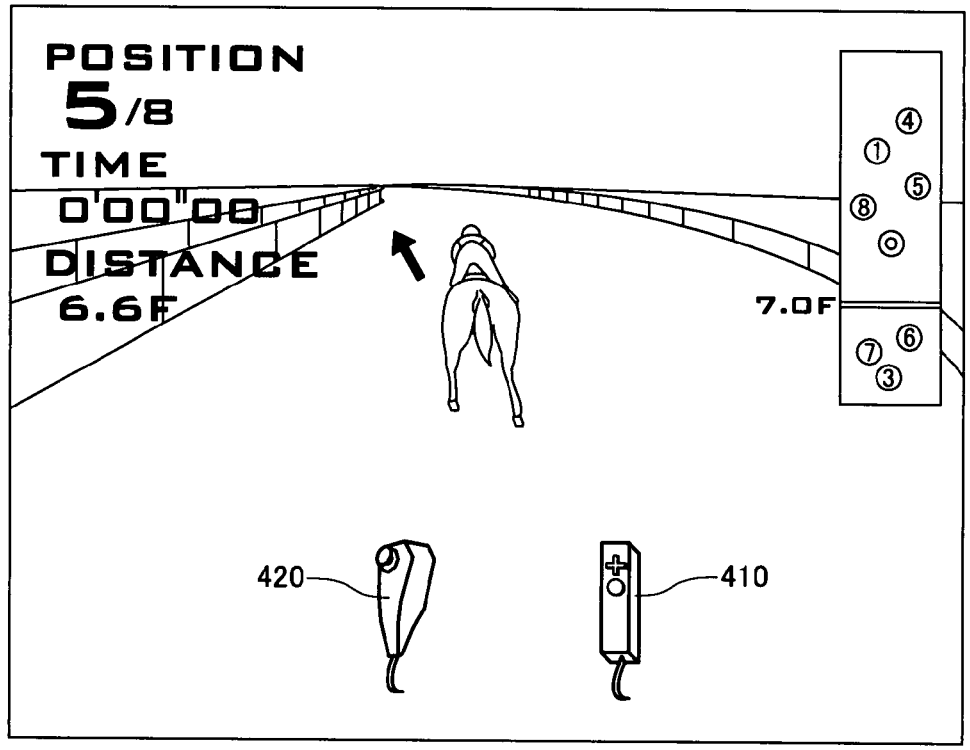
FIGS. 18A and 18B are views illustrative of an example in which vibration command display objects are respectively provided corresponding to a first controller and a second controller.
Figure 18B:
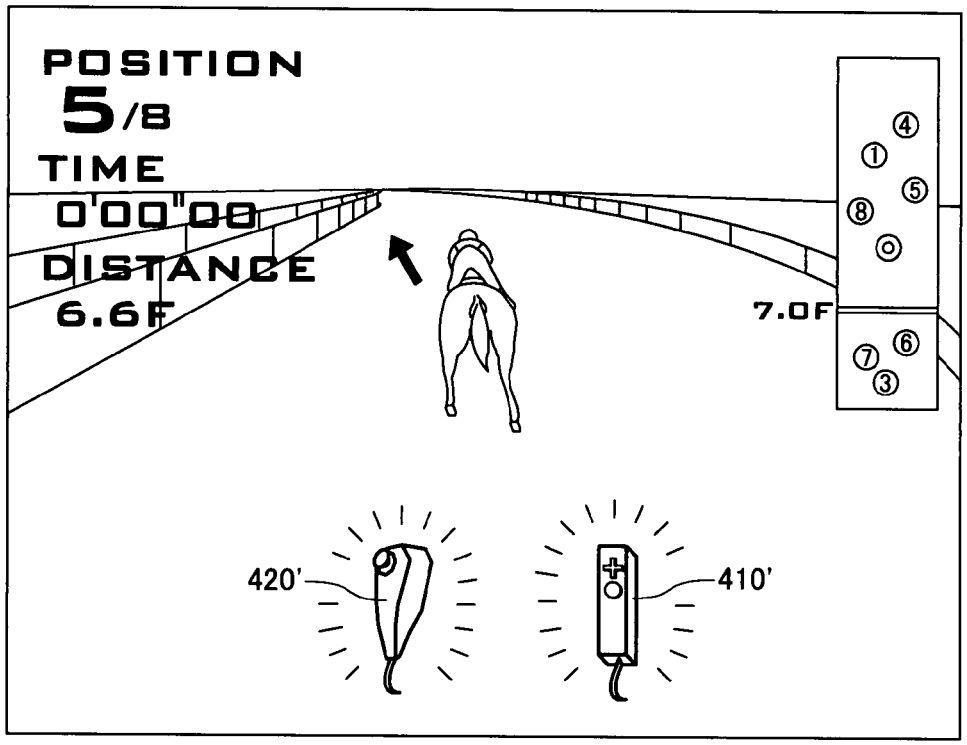

FIGS. 18A and 18B are views illustrative of an example in which the vibration command display objects are respectively provided corresponding to the first controller and the second controller.

A reference numeral 410 in FIG. 18A indicates a first vibration command display object associated with the first controller, and a reference numeral 420 indicates a second vibration command display object associated with the second controller.

For example, the first vibration command display object 410 may be changed when a vibration command determined based on the movement of the first controller has been detected, the second vibration command display object 420 may be changed when a vibration command determined based on the movement of the second controller has been detected, and the first vibration command display object 410 and the second vibration command display object 420 may be changed when a vibration command determined based on the movements of the first controller and the second controller has been detected.

Reference numerals 420' and 410" in FIG. 18B show a state in which the first vibration command display object 410 and the second vibration command display object 420 blink when a vibration command determined based on the movements of the first controller and the second controller has been detected to indicate that the vibration command has been detected.

This makes it easy for the player to determine the relationship between the detection state of the vibration command and the movement states of the first and second controllers.

Figure 19A:
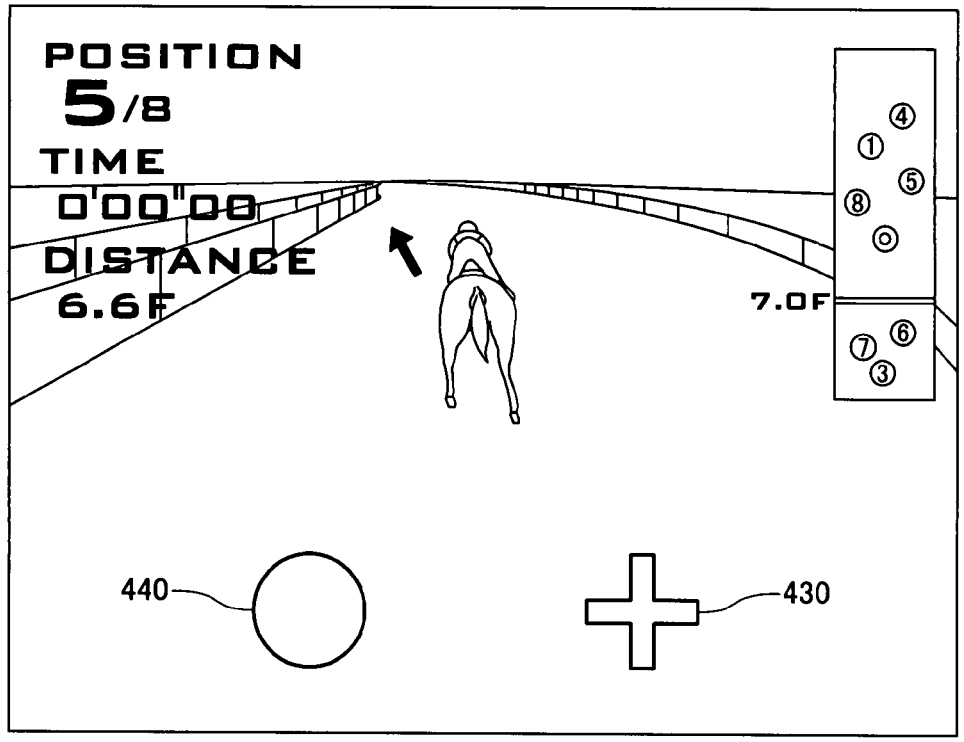
FIGS. 19A and 19B are views illustrative of an example in which a vibration command display object is provided corresponding to an operation section other than a movement operation input section.
Figure 19B:
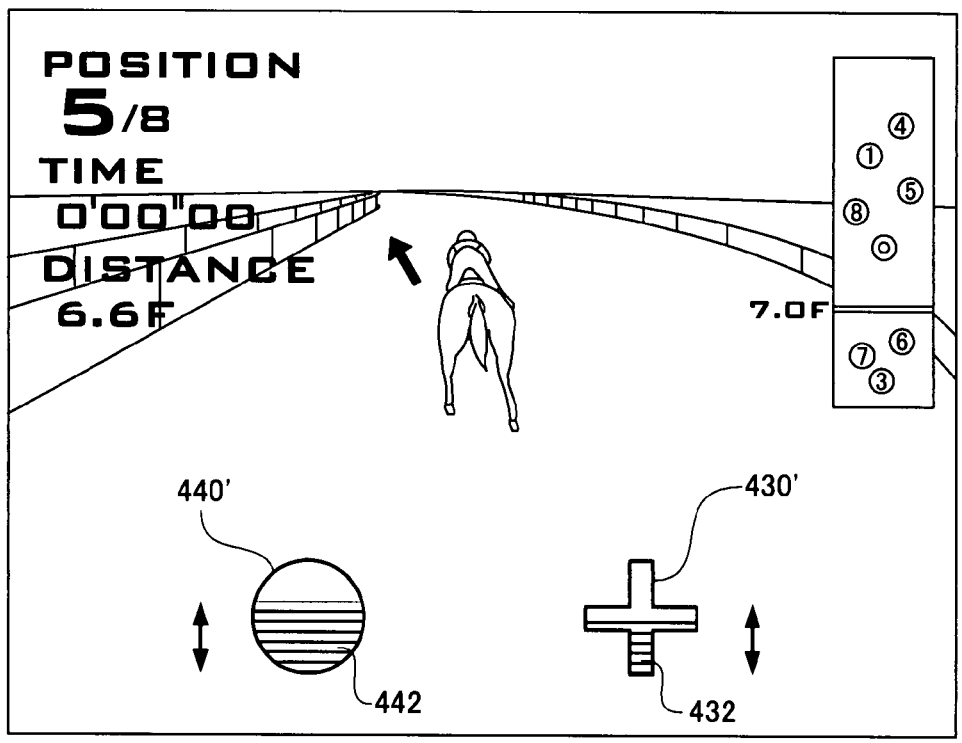

FIGS. 19A and 19B are views illustrative of an example in which the vibration command display object is provided corresponding to an operation section other than the movement operation input section.

A reference numeral 430 in FIG. 19A indicates a vibration command display object associated with the cross key, and a reference numeral 440 indicates a vibration command display object associated with the button.

For example, the vibration command display object 430 associated with the cross key may be changed when a vibration command determined based on the operation of the cross key and the movement of the controller has been detected, and the vibration command display object 440 associated with the button may be changed when a vibration command determined based on the operation of the button and the movement of the controller has been detected.

Reference numerals 430' and 440' in FIG. 19B indicate a state in which, when a vibration command determined based on the operation of the cross key and the movement of the controller and a vibration command determined based on the operation of the button and the movement of the controller have been detected, vibration gauges 432 and 442 are respectively displayed on the vibration command display object 430 associated with the cross key and the vibration command display object 440 associated with the button to indicate that the vibration commands have been detected.

The movement operation detection section may determine whether or not the output value from the movement sensor provided in at least one of the first controller and the second controller satisfies given conditions, and the operation input display control section may display the movement operation input display object indicating generation or the type of a pattern corresponding to the given conditions.

According to this embodiment, the player can become aware that a pattern corresponding to the given conditions has been generated by the movement of the controller or identify the type of the generated pattern.

For example, when the output value from the movement sensor satisfies given conditions in a performance game, the operation input display control section may display the movement operation input display object indicating generation or the type of a given performance pattern.

For example, when the output value from the movement sensor satisfies given conditions in a performance game, the operation input display control section may display the movement operation input display object indicating generation or the type of a given performance pattern.

For example, when the output value from the movement sensor satisfies given conditions in a fighting game, the operation input display control section may display the movement operation input display object indicating generation or the type of a given skill pattern.

The movement operation input detection section may include means for detecting movement performed in a given period based on the output value from the movement sensor provided in at least one of the first controller and the second controller, and the operation input display control section may display the movement operation input display object indicating the detected movement.

For example, the movement of the controller in a predetermined period may be reproduced as the movement operation input display object. This enables the player to view the player's movement performed in a predetermined period.

The movement/motion control section may determine whether or not conditions for a given movement operation input are satisfied based on the total value of the output value from the first movement sensor and the output value from the second movement sensor, and the operation input display control section may display the movement operation input display object indicating the total value of the output value from the first movement sensor and the output value from the second movement sensor.

The movement/motion control section may includes means for calculating the game parameter for controlling the movement or motion of the object based on a command corresponding to the operation input from the operation input means other than the movement sensor provided in the operation section, and the operation input display control section may perform display control of a command display object for displaying detection or the execution result of the command corresponding to the operation input from the operation input means other than the movement sensor provided in the operation section.

The command display object and the movement operation input display object may be configured as different objects.

According to this embodiment, the player can also become aware of the acceptance state of the operation input using the operation section such as a button, a lever, and a cross key.

An output control process of movement operation input notification sound for indicating the detection result of the movement operation input may be performed.

The invention may be applied to various image generation systems such as an arcade game system, a consumer game system, a large-scale attraction system in which a number of players participate, a simulator, a multimedia terminal, a system board which generates a game image, and a portable telephone.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer-readable information storage medium storing a program for playing a game based on a first input and a second input from an operation unit including a first controller and a second controller, the program causing a computer processor to perform steps of:

determining whether or not output values from a movement sensor provided in the first controller and a movement sensor provided in the second controller satisfy an acceptance condition for a given command input;

accepting the given command input when the output values satisfy the acceptance condition for the given command input;

performing a game calculation process including a process to control movement or motion of an operation target object of a player base on the given command input when the given command input is accepted;

performing a display control process of a movement operation input display object based on the output values for displaying whether or not the given command input is accepted, the movement operation input display object being configured to display a magnitude of the output values of the movement sensors in the first and second controllers;

generating a game image including (i) the movement operation input display object that is generated based on the display control process of the movement operation input display object, and (ii) the operation target object that is generated based on a game calculation process;

receiving the first input; and receiving the second input in response to a state of the movement operation input display object displaying that the acceptance condition has not been met, the movement operation input display object being displayed based on the first input;

wherein:

the operation target object is a target object of the player's operation and is different from the movement operation input display object.

2. The information storage medium as defined in claim 1, wherein the determining step further determines the acceptance condition for the given command input based on (i) the output value from the movement sensor provided in at least one of the first controller and the second controller, and (ii) another operation input value.

3. The information storage medium as defined in claim 1, wherein the performing the display control process further controls the movement operation input display object to be displayed or changed during a predetermined period of time at a predetermined timing.

4. The information storage medium as defined in claim 1, wherein the performing the display control process further displays the movement operation input display object for displaying a detection result of the given command input.

5. The information storage medium as defined in claim 1, wherein the performing the game calculation process further calculates a game parameter for controlling orientation or rotation of the operation target object of the player based on the given command input, and wherein the performing the display control process further changes orientation or rotational direction of the movement operation input display object based on the given command input.

6. The information storage medium as defined in claim 1, wherein the detecting step further detects an amount of operation associated with the given command input based on the output value from the movement sensor;

wherein the performing the game calculation process further calculates a game parameter associated with the given command input according to the amount of operation associated with the given command input; and wherein the performing the display control process further changes a form of the movement operation input display object based on the amount of operation associated with the given command input.

7. The information storage medium as defined in claim 1, wherein the determining step further determines whether or not the condition for the given command input is satisfied based on (i) an output value from a first movement sensor provided in the first controller, and (ii) an output value from a second movement sensor provided in the second controller; and wherein the performing the display control process further performs the display control process for displaying detection of the given command input by using a first movement operation input display object associated with the first controller and a second movement operation input display object associated with the second controller.

8. The information storage medium as defined in claim 1, wherein the detecting step further detects movement performed in a given period based on the output value from the movement sensor provided in at least one of the first controller and the second controller; and wherein the performing the display control process further displays the movement operation input display object indicating the detected movement.

9. The information storage medium as defined in claim 1, wherein the determining step further determines whether or not the acceptance condition for the given command input is satisfied based on a total value of a first output value from a first movement sensor and a second output value from a second movement sensor; and wherein the performing the display control process further displays a total movement operation input display object indicating the total value of the first output value from the first movement sensor and the second output value from the second movement sensor.

10. The information storage medium as defined in claim 1, wherein the performing the game calculation process further calculates a game parameter of an object based on a command corresponding to an operation input provided in the operation unit other than the movement sensor, and wherein the performing the display process further performs a display control of an operation input display object for displaying a detection result of an operation input corresponding to an operation input provided in the operation unit other than the movement sensor.

11. The information storage medium as defined in claim 1, the program further causing the computer processor to perform further steps of:

setting an initial setting operation period in which an initial setting operation input for a given command input is accepted, and adjusting a setting value of a condition for the given command input based on an output value from the movement sensor obtained by operation of the controller during the initial setting operation period.

12. The information storage medium as defined in claim 1, the program further causing the computer processor to perform steps of:

performing an output control process of movement operation input notification sound for indicating a detection result of the given command input.

13. The information storage medium as defined in claim 1, wherein the movement sensor is capable of measuring acceleration or velocity or displacement of at least one of the first controller and the second controller.

14. The information storage medium as defined in claim 1, wherein the first controller and the second controller are each configured to be held and operated by a single hand of a user.

15. The information storage medium as defined in claim 1, wherein the movement operation input display object is selected from a group consisting of a bar gauge, a semicircular gauge, an arrow, graphical icons visually similar to and representing the controllers, and graphical icons visually similar to and representing inputs on the controllers.

16. The information storage medium of claim 1, wherein the performing step further performs the display control process of the movement operation input display object for displaying the detection result of the given command input, irrespective of the movement or motion of the operation target object of the player.

17. An image generation system for playing a game based on a first input and a second input from an operation unit including a first controller and a second controller, the image generation system comprising:
   a memory having instructions,
   and a computer processor configured to execute the instructions to:
   determine whether or not output values from a movement sensor provided in the first controller and an output value from a movement sensor provided in the second controller satisfy an acceptance condition for a given command input;
   accept the given command input when the output values satisfy the acceptance condition for the given command input;
   perform a game calculation process including a process to control movement or motion of an operation target object of a player based on the given command input when the given command input is accepted;
   perform a display control process of a movement operation input display object based on the output values for displaying whether or not the given command input is accepted, the movement operation input display object being configured to display a magnitude of the output values of the movement sensors in the first and second controllers;
   generate a game image including (i) the movement operation input display object that is generated based on the display control process of the movement operation input display object, and (ii) the operation target object that is generated based on a game calculation process;
   receive the first input; and
   receive the second input in response to a state of the movement operation input display object displaying that the acceptance condition has not been met, the movement operation input display object being displayed based on the first input:
   wherein:
   the operation target object is a target object of the player's operation and is different from the movement operation input display object.

18. An image generation system as defined in claim 17, wherein the processor is further configured to execute the step of:
   performing an output control process of movement operation input notification sound for indicating a detection result of the given command input.

19. The information storage medium of claim 17, wherein the performing step further performs the display control process of the movement operation input display object for displaying the detection result of the given command input, irrespective of the movement or motion of the operation target object of the player.

20. A non-transitory computer-readable information storage medium storing a program for playing a game based on first input and a second input from an operation section including a first controller and a second controller, the program causing a computer processor to perform steps of:
   determining whether or not output values from a movement sensor provided in at least one of the first controller and the second controller satisfy an acceptance condition for a given command input;
   accepting the given command input when the output values satisfy the acceptance condition for the given command input;
   performing a game calculation process including a process to control movement or motion of an operation target object of a player based on the given command input when the given command input is accepted;
   performing a display control process of a movement operation input display object based on the output values for displaying whether or not the given command input is accepted. the movement operation input display object being configured to display a magnitude of the output values of the movement sensors in the first and second controllers;
   generating a game image including (i) the movement operation input display object that is generated based on the display control process of the movement operation input display object, and (ii) the operation target object that is generated based on a game calculation process;
   receiving the first input; and
   receiving the second input in response to a state of the movement operation input display object displaying that the acceptance condition has not been met the movement operation input display object being displayed based on the first input;
   wherein:
   the operation target object is a target object of the player's operation and is different from the movement operation input display object,
   the given command input is input by causing at least one of the entire first controller and the entire second controller to make predetermined movements or holding at least one of the first controller and the second controller in predetermined postures,
   the operation input display control section controls the movement operation input display object to be displayed or changed by displaying the presence or absence of the given command input or displaying the amount of operation when the input amount of operation of the given command input is also used as a control element, and
   the movement sensor is capable of detecting a change in spatial position of at least one of the entire first controller and the entire second controller.

* * * * *